US010395787B2

(12) United States Patent
Sumita et al.

(10) Patent No.: US 10,395,787 B2
(45) Date of Patent: Aug. 27, 2019

(54) NUCLEAR REACTOR SYSTEM FOR EXTINGUISHING RADIOACTIVITY

(71) Applicant: CLEAR INC., Tokyo (JP)

(72) Inventors: Osao Sumita, Tokyo (JP); Isao Ueno, Tokyo (JP); Takehiko Yokomine, Onojo (JP)

(73) Assignee: Clear Inc., Tokyo (JP)

( * ) Notice: Subject to any disclaimer, the term of this patent is extended or adjusted under 35 U.S.C. 154(b) by 0 days.

(21) Appl. No.: 15/759,509

(22) PCT Filed: Dec. 14, 2016

(86) PCT No.: PCT/JP2016/087241
§ 371 (c)(1),
(2) Date: Mar. 12, 2018

(87) PCT Pub. No.: WO2017/104708
PCT Pub. Date: Jun. 22, 2017

(65) Prior Publication Data
US 2019/0115116 A1 Apr. 18, 2019

(30) Foreign Application Priority Data
Dec. 15, 2015 (JP) .................. 2015-243675

(51) Int. Cl.
G21D 1/00 (2006.01)
G21C 15/28 (2006.01)
(Continued)

(52) U.S. Cl.
CPC ............ G21D 1/006 (2013.01); G21C 1/024 (2013.01); G21C 1/28 (2013.01); G21C 3/32 (2013.01);
(Continued)

(58) Field of Classification Search
CPC .......... G21D 1/006; G21D 1/00; G21C 11/06; G21C 3/32; G21C 1/28; G21C 15/28;
(Continued)

(56) References Cited

U.S. PATENT DOCUMENTS 3,227,619 A * 1/1966 Plante ................ G21C 7/22
137/563
3,261,755 A * 7/1966 Mostert .................. G21C 7/22
376/219
(Continued)

FOREIGN PATENT DOCUMENTS

JP S501299 A 1/1975
JP S5956200 A 3/1984
(Continued)

OTHER PUBLICATIONS

International Search Report dated Mar. 14, 2017, mailed in counterpart International Application No. PCT/JP2016/087241, 2 pages.
(Continued)

Primary Examiner — Hoang M Nguyen
(74) Attorney, Agent, or Firm — Patterson + Sheridan, LLP

(57) ABSTRACT

Provided is a nuclear reactor system and method therefor, for increasing the speed of conversion of a radionuclide to a stable nuclide to reduce radionuclide concentration using thermal neutrons produced by reducing the velocity of fast neutrons, while simultaneously subjecting fast-neutron-induced thermal energy of a primary cooling material to heat exchange with a secondary cooling material in a heat exchanger (7), and feeding the energy to a turbine system to generate power, the system having a nuclear reactor container (1) comprising a first container (11), and a second container (12), a plurality of metal fuel assemblies (22) and a liquid metal, which is the primary cooling material, being disposed in the first container, and the second cooling (Continued)

material capable of dual use as a neutron moderator and a MA radioactivity-extinguishing assembly or FP-extinguishing assembly (24) being loaded in the second container.

18 Claims, 20 Drawing Sheets

(51) Int. Cl.
  *G21F 9/28* (2006.01)
  *G21C 11/06* (2006.01)
  *G21C 3/32* (2006.01)
  *G21C 1/28* (2006.01)
  *G21C 1/02* (2006.01)
  *G21G 1/02* (2006.01)

(52) U.S. Cl.
  CPC .............. *G21C 11/06* (2013.01); *G21C 15/28* (2013.01); *G21F 9/28* (2013.01); *G21G 1/02* (2013.01); *G21D 1/00* (2013.01); *Y02E 30/34* (2013.01)

(58) Field of Classification Search
  CPC .. G21C 1/024; G21G 1/02; G21F 9/28; Y02E 30/34
  USPC .......................................................... 60/644.1
  See application file for complete search history.

(56) References Cited

U.S. PATENT DOCUMENTS

| | | | | |
|---|---|---|---|---|
| 5,185,120 | A * | 2/1993 | Fennern .................. | G21C 7/27 376/209 |
| 7,447,291 | B2 * | 11/2008 | Emin ...................... | G21C 7/16 376/328 |
| 2017/0213610 | A1 * | 7/2017 | Sumita ................... | G21C 1/02 |

FOREIGN PATENT DOCUMENTS

| | | |
|---|---|---|
| JP | H1048390 A | 2/1998 |
| JP | 2001264487 A | 9/2001 |
| JP | 2004093141 A | 3/2004 |
| JP | 2004191190 A | 7/2004 |
| JP | 2015075942 A | 4/2015 |
| JP | 2015197656 A | 11/2015 |
| WO | 2013094196 A1 | 6/2013 |

OTHER PUBLICATIONS

W.F. Murphy et al., Postirradiation Examination of U—Pu—Zr Fuel Elements Irradiated in EBR-II to 4.5 Atomic Percent Burnup, ANL-7602, Argonne National Laboratory, 1969, 63 pages.

Mamoru Konomura et al., Comparative Design Study of FR Plants with Various Coolants (1)—Studies on Na Coolant, FR, Pb—Bi Coolant FR, Gas Coolant FR-, JNC Technical Review No. 12 ex, Sep. 2001, Japan Nuclear Cycle Development Institute, 27 pages (with partial English translation).

H. Oigawa, Challenge to Nuclear Transmutation Technology for Radioactive Wastes, Tokai Forum Lecture 9, J-PARC Center, Nuclear Science and Engineering Center, Japan Atomic Energy Agency, 2014, 29 pages (with partial English translation).

Annie Makhijani et al., Waste Transmutation: The Nuclear Alchemy Gamble, Science for Democratic Action, vol. 8, No. 3, May 2000, 20 pages.

Jere H. Jenkins et al., Evidence for Correlations Between Nuclear Decay Rates and Earth-Sun Distance, Astroparticle Physics, vol. 32, Issue 1, arXiv: 0808.3283v1, Aug. 25, 2008, 4 pages.

Shin-Ichiro Abe et al., Feasibility study of nuclear transmutation by negative muon capture reaction using the PHITS code, EPJ Web of Conferences 122, 04002, 2016, 6 pages.

Howard R. Reiss, Final Report Accelerated Beta Decay for Disposal of Fission Fragment Wastes, Physics Department, American University, Mar. 6, 2000, 24 pages.

A.V. Simakin et al., Accelerated alpha-decay of uranium isotopes induced by exposure of aqueous solution of uranium salt with gold nanoparticles to laser radiation, Physics of Wave Phenomena, vol. 21, Issue 1, 8 pages.

M. Pitkanen, About Strange Effects Related to Rotating Magnetic Systems, Dept. of Physics, University of Helsinki, Helsinki, Finland, 2016, 107 pages.

* cited by examiner

NUCLEAR REACTOR SYSTEM FOR EXTINGUISHING RADIOACTIVITY

TECHNICAL FIELD

The present invention relates to a nuclear reactor system, and particularly to a nuclear reactor vessel, a nuclear reactor system and a method which, while generating electricity, are capable of prompting nuclear transmutation of long-life radioactive nuclides, such as radioactive nuclear fission products, into stable nuclides, and accelerating decay processes of relatively short-life radioisotope nuclides.

BACKGROUND ART

1. Cooling System of Nuclear Reactor

Nuclear Reactors under construction are roughly classified into: fast reactors using fast neutrons; and thermal-neutron reactors using thermal neutrons. Many of the fast reactors use uranium (U) and/or plutonium (Pu) as fuel, and metallic sodium (Na) as a primary coolant. Existing power generating systems have used a steam turbine, and thus need a heat exchanger for transferring heat between metallic Na and water ($H_2O$). If metallic Na contacts $H_2O$, metallic Na will reacts with $H_2O$, and an explosive hydrogen gas will be produced. This has been a problem. With danger due to the reaction between metallic Na and $H_2O$ taken into consideration, the number of actually-constructed fast reactors has not been so large. The followings are among methods of constructing a cooling system without using the combination of metallic Na and $H_2O$.

One method is to not use $H_2O$ as the secondary coolant although metallic Na is used as the primary coolant.

The most promising candidate as the secondary coolant is carbon dioxide ($CO_2$) gas. Research and development on the application of supercritical carbon dioxide gas to a turbine has been underway, and an actual turbine is currently about to start its production. A supercritical carbon dioxide gas turbine with a power generation capacity of up to 10 MW can be produced. Patent Literature 1 relates to a small-scale nuclear power generation system which uses metallic Na as the primary coolant and supercritical carbon dioxide gas as the secondary coolant. The nuclear power generation system, however, is considered as having a positive void reactivity, and having difficulty in maintainability during fuel replacement and the like due to unclearness of metallic Na.

Another method is to use Pb—Bi or Pb alone as the primary coolant while using $H_2O$ as the secondary coolant. Research and development on a Pb—Bi reactor is underway in Russia, and the reactor uses a Pb—Bi eutectic alloy (45% of Pb vs. 55% of Bi). Yet another method is to use Sn. Focusing on Pb—Bi, effectiveness and the like will be hereinbelow discussed.

Advantages of Pb—Bi coolant can be cited as follows.
(1) The Pb—Bi coolant requires no intermediate cooling system. Since heavy metals have low reactivity with water, facilities for preventing fire from starting with combustion due to leakage of the coolant is also not needed.
(2) Lead has a boiling point of 1,737° C., and the lead-bismuth eutectic alloy has a boiling point of 1,670° C. Their boiling points are higher than that of Na. Use of the high boiling points of the respective coolants makes it possible to obtain higher safety.
(3) The neutron absorption cross section of Pb—Bi is smaller than that of Na, and the scattering cross section of Pb—Bi is larger than that of Na. Excellent proliferation and minor actinide (MA) burnup can be expected from the Pb—Bi coolant.
(4) The coolant density of the Pb—Bi coolant is almost equal to that of mixed oxide fuel (MOX fuel). If the fuel melts, the molten fuel is less likely to accumulate in the bottom portion of the reactor vessel. Accordingly, it can be expected that the Pb—Bi reactor makes the influence of construction of logic for preventing re-criticality upon the reactor core designing smaller than the Na reactor.
(5) In metal fuel of a Pu—U—Zr ternary alloy, noble gas components generated under neutron irradiation are homogeneously distributed in the metal structure. Against this background, there is a report that the metal thermal expansion coefficient is larger by three digits or more than in a case where no noble gas components are generated (Non Patent Literature 1). From this result, a phenomenon that like the specific weight of the MOX fuel, the specific weight of the metal fuel of the ternary alloy is lighter than that of the coolant can be expected to take place.

On the other hand, disadvantages of Pb—Bi coolant can be cited as follows.
(1) The heavy metals contained in Pb—Bi coolant are highly corrosive. This corrosiveness narrowly limits selection of structural materials.
(2) Pb—Bi coolant has a greater specific weight than Na coolant. It is considered that Pb—Bi coolant corrodes structural material more than Na coolant when Pb—Bi coolant and Na coolant flow al the same rate. This limits the linear flow rate of Pb—Bi coolant strictly, and decreases design freedom.
(3) When Pb—Bi coolant is irradiated with neutrons, volatile polonium (Po210) is produced. This requires hermetic management of the cover gas system covering the coolant, and the fuel handling system. This also makes maintenance work difficult.
(4) The greater specific weight of the coolant requires a larger pump shaft power. In addition, "Torricelli's vacuum" causes a problem of decreasing design freedom because of things such as impossibility of employing the top entry method for the main cooling system or the decay heat removal system.
(5) An increase in weight due to the greater specific weight of the coolant and greater thickness require reconsideration of supporting structures for the vessels and pipes, and more attention to earthquake-resistant design.

In a case where a well-proven steam turbine is used, a fast-neutron reactor can be operated using Pb—Bi or Sn, a liquid at high temperature, instead of metallic Na. Research and development on fast-neutron reactors using Pb—Bi as the primary coolant have been conducted widely. Use of Pb—Bi as the primary coolant is advantageous in making it possible to use a well-proven steam turbine. On the other hand, heavy metals, such as Pb—Bi, involve a risk of corrosively damaging structural materials at high temperature. This poses a serious practical problem (Non Patent Literature 2).

Meanwhile, the light-water reactor is a typical type of thermal-neutron reactor. There are varieties of light-water reactors: the pressurized water reactor and the boiling water reactor. Technologies for the pressurized water reactor and the boiling water reactor are almost established. In the past, there were carbon dioxide gas-cooled reactors which used carbon as a moderator and carbon dioxide gas as coolant. They have been replaced with light-water reactors. Light-water reactors use oxide fuel, and control a degree of combustion of nuclear fuel basically using a control rod. Spent nuclear fuel is subjected to wet reprocessing.

2. Nuclide Separation and Annihilation Treatment of Radionuclides 2-1. Radionuclides Generated in Nuclear Power Generation and their Properties.

Main nuclear reactions in a nuclear reactor are divided roughly into: a reaction in which other radioactive nuclides (fission products) are produced with neutron irradiation to fissile U235 and Pu239, and a reaction in which irradiation to fissionable transuranic nuclides such as U238 transmute into Pu or other transuranic nuclides by absorbing neutron. Table 1, using Non Patent Literature 3 as a reference and in a summarized form, shows nuclides which have the longest life, the highest amount of radiation and the highest toxicity among the radionuclides contained in spent nuclear fuel to be discharged from a nuclear reactor. As learned from Table 1, spent nuclear fuel is classified roughly into transuranic nuclides (TRUs) and nuclear fission products (FPs). Furthermore, TRUs include minor actinides (MAs). Each MA has a long-life and a large amount of radiation, emits a neutron, and generates heat. From a different viewpoint, MAs are effective as an energy source. MAs basically transform by α-decay, and emit γ-ray after α-decay. Thereafter, MAs repeat β-decay and γ-decay, and eventually transmute into stable nuclides. Neutron bombardment is effective to stabilize MAs. In addition to MAs, FPs which have relative long life and high toxicity are contained in spent nuclear fuel. Many of FPs tend to transmute into stable nuclei through β-decay and γ-decay.

emit γ-ray into stable elements. To put it specifically, Np237, Am241, Am243, Cm244 and the like are considered as problematic, as shown in Table 1. These nuclides have long half-life, and tend to generate much heat. These nuclides need measures to counter strong emission of γ-rays and neutron beams. Among these minor actinide nuclides (MAs), Cm244 shows a strong tendency to fission spontaneously. A measure to counter neutrons generated by this spontaneous nuclear fission needs to be taken in order to reduce radionuclides, such as MAs, in a nuclear reactor.

(2) Radioisotope Elements with Relatively Short Life

The decay rates of radioactive nuclides, not the minor actinide elements, are determined mainly by their β-decay processes. Immediately after β-decay, γ-decay occurs. Since this β-decay is a forbidden transition from a viewpoint of quantum mechanics, transition probability is low, and the γ-decay rate is accordingly small.

2-2. Effects Expected from Nuclide Separation and Reducing Processes

High-level radioactive waste generated by operation of a nuclear power plant includes more nuclear fission products, which are more radioactive and have higher heat quantity but have shorter half-life, and more nuclear fission products and transuranic elements, which are less radioactive but have longer half-life, than low-level radioactive waste generated by the operation of the nuclear power plant. The existence of nuclear fission products and transuranic elements with longer half-life makes it impossible to secure safety by the "managed disposal" which reduces management on a step-by-step basis in response to a decrease in the

TABLE 1

Main Radioactive Elements in Spent Fuel

| | Nuclide | Half-life | Dose Conversion Factor (µSv/kBq) | Content (per ton) | Heat Generated (W/g) | Gamma-ray intensity (γ/g · s) | Neutron Beam Intensity (n/g · s) |
|---|---|---|---|---|---|---|---|
| Transuranic Element (TRU) | Pu238 | 87.7 years | 230 | 0.3 kg | 0.56 | 3.00E+08 | 36000 |
| | Pu239 | 24000 years | 250 | 8 kg | 0.002 | 1.10E+06 | 96 |
| | Pu240 | 6848 years | 250 | 3 kg | 0.007 | 3.90E+06 | 1300 |
| | Pu241 | 14.3 years | 4.8 | 1 kg | 0.0004 | 1.20E+07 | 1.23 |
| Minor Actinide (MA) | Np237 | 214 million years | 110 | 0.6 kg | 0.0002 | 7.30E+06 | 0.9 |
| | Am241 | 432 years | 200 | 0.4 kg | 0.11 | 4.90E+10 | 7000 |
| | Am243 | 7370 years | 200 | 0.2 kg | 0.007 | 5.50E+09 | 540 |
| | Cm244 | 18.1 years | 120 | 60 g | 2.8 | 8.90E+08 | 1.20E+07 |
| Nuclear Fission Product (FP) | Se79 | 295000 years | 2.9 | 6 g | | | |
| | Sr90 | 28.8 years | 28 | 0.6 kg | | | |
| | Zr93 | 153 million years | 1.1 | 1 kg | | | |
| | Tc99 | 211000 years | 0.64 | 1 kg | | | |
| | Pd107 | 650 million years | 0.037 | 0.3 kg | | | |
| | Sn126 | 10 million years | 4.7 | 30 g | | | |
| | I129 | 1570 million years | 110 | 0.2 kg | | | |
| | Cs135 | 230 million years | 2 | 0.4 kg | | | |
| | Cs137 | 30.1 years | 13 | 1.5 kg | | | |

For example, in a case where U235 fissions, approximately 80 types of nuclear fission products are produced. Their mass numbers widely range from 72 to 160. The distribution of their mass numbers is saddle-shaped with one peak around the mass number of 90 and the other peak around the mass number of 140. The decay processes of these fission products are divided roughly into two types: α-decay and β-decay. Usually, γ-decay occurs after α-decay or β-decay. Target nuclear fission products of the present invention are as follows.

(1) Minor Actinide Elements with Long Half-Life

There has been a report that these nuclides undergo transmutation by α-decay, emit neutrons, β-decay, and then concentration of radionuclides, and completes the management several years later. Against this background, safe burial disposal (geological disposal) of high-level radioactive waste in a deep stable geologic formation away from the human living environment is expected to be performed for the purpose of preventing the living environment from being significantly affected by the radioactive waste. It is difficult, however, to secure a place for the burial disposal. For this reason, a technique of reducing radioactive waste is needed.

2-3. Nuclide Separation Technique

As discussed above, high-level radioactive waste includes: nuclear fission products, which are more radioactive and have higher heat quantity but have shorter half-life, and nuclear fission products which are less radioactive but have longer half-life like actinide elements. The technique of separating nuclear fission products with longer half-life from nuclear fission products with shorter half-life is based on the reprocessing technology of extracting U and Pu from spent fuel. Some different methods have been also under examination. These methods are divided roughly into: an advanced wet reprocessing method using water and an organic solvent as solvent; and a dry reprocessing method using molten chloride and cadmium (Cd) liquid metal as solvent. Both are currently adopted as reprocessing methods in Japan. The wet reprocessing method is used mainly for fuel using metal oxide. Application of the wet reprocessing method makes it possible to produce nuclear weapons by increasing the purity of U or Pu. On the other hand, the dry reprocessing is suitable for metal fuel. It is said that the dry reprocessing method is not suitable to produce nuclear weapon since the concentration of impurities in radioisotope nuclides. The dry reprocessing method extracts U235 and Pu239 by electrolytic refining, but it is impossible to avoid mixture of minor actinide nuclides as impurities since the minor actinide nuclides are close to U235 nuclide and Pu239 nuclide. Patent Literature 2 has disclosed a method of improving accuracy of the electrolytic refining. On the other hand, it is easy to separate radioactive nuclear fission products (FPs) having relatively small mass numbers.

2-4. Decay Rate Acceleration (Reducing Process) Techniques

There are several types of decay rate acceleration (reducing process) techniques as follows, (Acceleration of Decay Rate Using Neutrons)

Neutrons are divided roughly into fast neutrons with energy of 0.5 MeV or more, and thermal neutrons with energy of 0.5 MeV or less. Although there is a case where thermal neutrons are further divided into groups, the present invention will refer to neutrons with energy of 0.5 MeV or less as thermal neutrons.

The minor actinide (MA) elements shown in Table 1 are materials which, like U and Pu, can be transmuted by neutron capture. With this taken into consideration, one may consider that the most effective way of transmuting minor actinide elements into other stable elements is to cause a nuclear fission reaction using a nuclear reactor. A light-water reactor, a fast-neutron reactor and a proton accelerator-driven subcritical fast-neutron reactor are considered as being usable as the nuclear reactor suitable for the above purpose. As shown in FIG. 1 (Patent Literature 4), minor actinide elements are characterized as capturing fast neutrons with higher energy more efficiently, or as being more efficiently made to undergo a nuclear fission reaction by fast neutrons with higher energy. Furthermore, the reducing process using a nuclear reactor can be considered as using minor actinide elements as fuel for electric power generation.

Nuclear fission products include long half-life nuclides such as iodine (I)-129 (not included in glass-solidified matter) and technetium (Tc)-99. For these nuclides, use of neutron capture reaction which makes a nuclide capture a neutron and transmute into another nuclide, may be considered. In this case, a scheme of sufficiently moderating a neutron is needed before the neutrons are captured by radioactive nuclides in a fast-neutron reactor, in addition, photonuclear reaction which makes a nuclear fission product absorb γ-ray and transmute into another nuclide may be considered as well. Thereby, for example, cesium (Cs)-137 can be transmuted into barium (Ba)-136, a stable nuclide. Use of an accelerator to cause this react has been planned.

(Method of Using Elementary Particle)

In addition to the above-discussed methods, there is a method using an elementary particle. Jere H. Jenkins et al. have reported that fluctuations in decay rate of a radionuclide are correlated with neutrinos which reach the earth from the sun (Non Patent Literature 5). To put it specifically, they have reported that: the rate of β-decay of Si32 fluctuates in correlation with neutrino flux; and the rate of α-decay of Ra226 also fluctuates in correlation with neutrino flux.

Furthermore, S. Abe et al. have reported that: muons accelerate the β-decay rate; and this acceleration would be effective to achieve a process of reducing radioactive reactor waste in the future (Non Patent Document 6). Absorption of a muon by a nucleus transmutes the element into a new isotopic nuclide. However, a large number of muons need to be produced in order to reduce a large amount of radioactive waste. They have reported that a huge accelerator was used to generate muons and elementary particles as their source.

(Another Decay Rate Acceleration Using Field: β-Decay Nuclides)

β-decay is divided into Pi decay with electron emission and $β^+$ decay with positron emission. Before the 1990s, it was said that the β-decay rate was not changed by external conditions. In addition, long-life β-decay transition is basically a forbidden transition from a viewpoint of quantum mechanics. Nevertheless, it has been proposed that: the forbidden transition has no absolute significance; and the decay rate can be accelerated by applying a strong low-frequency electromagnetic field, which can give angular momentum enough to break quantum mechanical selection rules, to nuclei. For the purpose of changing the decay rate of a nucleus, the electronic state in the nucleus needs to be changed by the electromagnetic field. H. R. Reiss et al. have proposed a method of accelerating the β-decay rate in a report (Non Patent Literature 7) given below.

Non Patent Literature 7 has summarized a basic theory on a basic physical phenomenon caused by strong interaction between a low-frequency electromagnetic field and a nucleus, particularly on the β-decay rate. In order to incorporate an allowed transition to a basically forbidden transition, the perturbation theory in quantum mechanics was applied to the interaction between a nucleus and an electromagnetic field in the beginning. For example, using an interaction Hamiltonian λH, a Hamiltonian $H_T$ representing a state of a nucleus is expressed with $$H_T = H_0 + \lambda H \quad \text{(Equation 1)}.$$

When the perturbation term is effective, there are multiple energy levels, and the allowed transition is partially mixed.

Another method is to combine the Hamiltonian $H_T$ with a non-perturbation term representing a completely different mechanism. This method is achieved, for example, by: putting an atom into a plasma state; and thereby reducing the shielding effect provided by the electrons around the nucleus. The reduction in the shielding effect makes it possible for an eternal field to directly affect the nucleus. Furthermore, when the nucleus itself is unstable due to its decay or the like, the nucleus is more likely to be affected by the external field.

As a specific method, a possibility of accelerating the $β^-$ decay rate, which can be handled as a perturbation term, was measured. It was confirmed that the $β^-$ decay rate increased by $10^{-4}$ or more when Cs137, a radioactive element, was placed in a cavity resonator at a radio frequency of 1 kHz to 50 MHz. In addition, it has been recently reported that the decay rate was able to be increased by irradiation of a MeV-energy pulse laser beam (Non Patent Literature 8). For example, it has been reported that irradiation of a pulse with a frequency of 1 kHz or less in several femtoseconds ($10^{-15}$ seconds) was promising (Non Patent Literature 8). Based on these results, in principle, the rate of decay of a radioactive element now can be changed by applying a low-frequency electromagnetic field to the radioactive element. This is because the application of the low-frequency electromagnetic field makes it possible to reduce the shielding effect of the electrons around the nucleus.

Meanwhile, with regard to strange effects related to rotating magnetic fields, M. Pitkanen has reported a phenomenon caused based on topological geometro-dynamics (TGD) (Non Patent Literature 9). An electric field is induced by the Lorentz force when a magnetic field is rotated. M. Pitkanen has reported the likelihood that the reduction in the shielding effect of the electrons around the nucleus using such electric and magnetic fields makes it possible to accelerate the rate $\beta^-$ decay rate using the external field.

CITATION LIST

Patent Literature

Patent Literature 1: International Publication Pamphlet No. WO2013/094196
Patent Literature 2: Japanese Patent Application No. 2015-197656
Patent Literature 3: Japanese Patent Application No. 2015-075942

Non Patent Literature

NON PATENT LITERATURE 1: Murphy, W. F., Beck, W. N., Brown, F. Koprowski, B. J., and Neimark, L. A. [1969]. "POSTIRRADIATION EXAMINATION OF U—Pu—Zr FUEL ELEMENTS IRRADIATED IN EBR-I 1 TO 4.5 ATOMIC PERCENT BURNUP", ANL-Report-7602, Argonne National Laboratory, 9700 South Cass Avenue, Argonne, Ill.
NON PATENT LITERATURE 2: Koremura, M., Shimakawa, Y., Hori, T., Kawasaki. N., Enuma, Y., Kida, M., Kasai, S., Ichinomiya, M. *JNC Technical Review no.* 12 *ex* (September, 2001), Japan Nuclear Cycle Development Institute.
NON PATENT LITERATURE Oigawa, H., [2014]. "Challenge to Nuclear Transmutation Technology for Radioactive Wastes." *Tokai Forum Lecture* 9, J-PARC Center, Nuclear Science and Engineering Center, Japan Atomic Energy Agency.
NON PATENT LITERATURE 4: Makhijani, A., and Zerrlffl, H., [2000], "Waste Transmutation/Energy for Peace; Nuclear Power Deception." *SDA Newsletter vol.* 8, *no.*3, Institute for Energy and Environment Research, 6935 Laurel Ave., Suite 201 Takoma Park, Md.
NON PATENT LITERATURE 5: Jenkins, J. H., Fischbach, E., Buncher, J. B., Gruenwald, J. T., Krause, D. E., and Mattes, J. J. [2009], "Evidence for Correlations Between Nuclear Decay Rates and Earth-Sun Distance," *Astroparticle Physics*, vol. 32, issue 1, pp. 42-46, cite as arXiv: 0808.3283v1.
NON PATENT LITERATURE 6: Abe, S., and Sato, T. [2016]. "Feasibility Study of Nuclear Transmutation by Negative Muon Capture Reaction Using the PHITS Code." *EPJ Web of Conferences vol.* 122 (CNR*15-5th International Workshop on Compound-Nuclear Reactions and Related Topics), article no. 04002.
NON PATENT LITERATURE 7: "Final Report: Accelerated Bate Decay for Disposal of Fission, Fragment Wastes" written by Principal investigator, Reiss, H. R., Physics Department, American University, Washington, D.C. 20016-0805. [2000],
NON PATENT LITERATURE 8: Simakin, A. V., and Shafeev, G. A. 120131. "Accelerated alpha-decay of 232 U isotope achieved by exposure of its aqueous solution with gold nanoparticles to laser radiation." *Physics of Wave Phenomena*, vol.21, no. 1, pp. 31-37.
NON PATENT LITERATURE 9: "About Strange Effects Related to Rotating Magnetic Systems" written by Pitkanen, M., Dept. of Physics, University of Helsinki, Helsinki, Finland. [2016]. Email: matpitka@rock.helsinki.fi.

SUMMARY OF INVENTION

Technical Problem

The present invention has been made in order to solve a problem of difficulty in securing a place for safe burial disposal of high-level radioactive waste generated by a nuclear reactor in a deep stable geologic formation for the purpose of preventing the living environment from being significantly affected by the radioactive waste.

An object of the present invention is to provide a nuclear reactor, a nuclear reactor system and a method which, while generating electricity, is capable of, through application of the above-discussed principles, promoting nuclear transmutation of long-life radioactive elements, such as minor actinide elements and other radioactive nuclear fission products, into stable nuclides by use of fast neutrons and thermal neutrons, and increasing the rate of decay of relatively short-life radioisotope nuclides by use of application of low-frequency magnetic field.

Solution to Problem

The present invention aims at providing a nuclear reactor which has a function of accelerating the rates of $\alpha$- and $\beta$-decays of radionuclides using the following methods based on the above phenomena.
1. Nuclear Reactor with Two Regions (Fast Neutron Region Plus Thermal Neutron Region)

A relationship of a neutron capture cross section of radioactive elements and a fission cross section with neutron energy need to be taken into consideration in order to accelerate the $\alpha$-decay rate and the $\beta$-decay rate using neutrons. For the purpose of using neutrons in a wide range of energy levels, it is desirable to employ a nuclear reactor which is capable of using both fast neutrons and thermal neutrons at the same time. To this end, a single nuclear reactor vessel is basically designed to have two regions therein: a fast neutron region as a first vessel, and a thermal neutron region as a second vessel. To put it specifically, this design is realized by installing one nuclear reactor vessel in the other nuclear reactor vessel.

FIGS. 2A, 2B and 2C schematically illustrate structures of nuclear reactors each having both the fast neutron region and the thermal neutron region. In the structure illustrated in FIG. 2A, first of all, radioactivity reducing assembles (FP) 24 are loaded in a second vessel 12 serving as the thermal neutron region. Secondary coolant inlet and outlet 43, 44 are attached to the second vessel 12. Thereafter, a first vessel 11 is placed inside the second vessel 12, and fuel assemblies 22, each of which is an assembly of fuel rods into which MAs are mixed in addition to U and Pu, are loaded in the first vessel 11. A reflector 31 based on Patent Literature 3, which is capable of performing a load following control method of changing its efficiency as a neutron reflector depending on thermal deformation of its supporting mechanism and the like, is arranged surrounding the fuel assemblies.

In the structure illustrated in FIG. 2B, first of all, the FP reducing assemblies 24 are loaded in the second vessel 12. The secondary coolant inlet and outlets 43, 44 are attached to the second vessel 12. Thereafter, the first vessel 11 is put inside the second vessel 12, and the fuel assemblies 22 are loaded in the first vessel 11. The thermally-deformable reflector 31 based on Patent Literature 3 is arranged surrounding the fuel assemblies. In addition, this structure is based on the assumption that the concentration of MAs mixed in the fuel assemblies 22 is high. Thus, loading of a control rod is also effective as a measure to counter excessive neutrons generated attributable to spontaneous nuclear fission of MAs, as discussed above. As an additional measure, depending on the necessity, a multi-segmented reflector 31 capable of performing the load following control method based on thermal expansion and contraction is arranged with the reactor core basically made closer to the critical size.

FIG. 2C illustrates a structure which is different from the inner reactor structure illustrated in FIG. 2B. The structure makes the primary coolant, filled in the first vessel, undergo natural convection. The first vessel 11 is arranged in a nuclear reactor vessel 1. Thereafter, the fuel assemblies 22 and the MA reducing assemblies 23 are loaded in the first vessel 11, as well as the reflector 31 is arranged surrounding the fuel assemblies 22 and the MA reducing assemblies 23. A cylinder 160 for facilitating the natural convection of the primary coolant is arranged surrounding the reflector 31, the fuel assemblies 22 and the MA reducing assemblies 23. Furthermore, the second vessel 12 is arranged surrounding the first vessel. The FP reducing assemblies 24 are arranged in the second vessel 12. The secondary coolant is made to flow from the secondary coolant inlet and outlet 43, 44 while circulated inside the second vessel 12. Heat from the nuclear reaction inside the first vessel and heat from FPs inside the second vessel heat the secondary coolant. As the primary coolant, Sn may be used instead of Pb—Bi.

The object of the present invention is to manufacture a nuclear reactor for annihilating radioactivity with lower operating costs at lower manufacturing costs. To this end, the load following control method using the thermal deformation of the reflector due to the thermal expansion phenomenon, as discussed in detail in Patent Literature 3, is employed around the small reactor core (fuel assemblies). The material of the reflector of the present invention is made of carbon (C) or beryllium (Be). Furthermore, a metal fuel pin having a Zr—Pu—U composition is inserted into a stainless-steel fuel rod included in each fuel assembly to be used in the present invention. Fifty or more fuel rods are bundled into one fuel rod. With regard to this metal fuel pin, there has been a report that: noble gas components are generated in a homogeneously distributed state in the fuel pin by neutron bombardment; and a phase change takes place in a range of 600° C. to 650° C. (Non-patent Literature 10). Through these two phenomena, the fuel pin thermally expands in the order of several percent. Due to this, reactivity of nuclear fission in this temperature range goes below criticality (Neutron multiplication factor: keff<1). The present invention enables the economical safety design based on the natural phenomenon of thermal expansion, but not the above-discussed safety systems from an engineering viewpoint.

2. Arrangement of Radioactivity Reducing Assemblies Suitable to Accelerate Radioactivity Decay Rate As shown in Table 1, the radioactivity reducing fuel assemblies into which mainly FPs are mixed are processed in the same way as the fuel, and as the radioactivity reducing rods, are loaded in the second vessel serving as the thermal neutron region. For the purpose of making the second vessel a region in which thermal neutrons can be used, fast neutrons generated in the first region have to be transmuted into thermal neutrons. To this end, a moderator/coolant is circulated inside the second vessel. The following materials are examined as the moderator/coolant to be used in the present invention.

(Secondary Coolant Concurrently Serving as Moderator)

$CO_2$ gas (supercritical $CO_2$ gas or subcritical $CO_2$ gas) and water (light water or heavy water) are effective as materials which can be used as the moderator/coolant. In the present invention, in a case where metallic Na is used as the primary coolant, a supercritical $CO_2$ gas turbine or a subcritical $CO_2$ gas turbine is incorporated in the system. $CO_2$ is effective as the moderator as well. After used as power for the turbine, supercritical $CO_2$ need to be heated. The thermal efficiency can be enhanced by: preliminarily re-heating supercritical $CO_2$ in the second vessel and thereafter heating the resultant super critical $CO_2$ in a main heat exchanger. In a case where Pb—Bi or Sn is used as the primary coolant, water can be used as the secondary coolant. Since water is an efficient moderator as well, water is effective for the present invention.

(Arrangement of Fuel Assemblies (MAs Mixed))

Since metal fuel is loaded, the present invention is based on the assumption that dry reprocessing of spent fuel is performed, in case where a fuel pin is produced through dry reprocessing, it is impossible to remove all the MAs, impurities. Thus, MAs are mixed in each fuel assembly. When MAs are irradiated with fast neutrons, MAs are transmuted into stable nuclei. Active use of this mechanism by increasing the degree of mixture of MAs in the fuel pin makes it possible to increase the MA reducing rate.

(Arrangement of Fuel Assemblies and Radioactivity Reducing Assemblies)

FIG. 4 illustrates an example of how the fuel assemblies and the radioactivity reducing assemblies are arranged in the fast neutron region and the thermal neutron region. In FIG. 4, the second vessel serving as the thermal neutron region is set outside the first vessel serving as the fast neutron region. The fuel assemblies 22 are loaded in the first vessel, and the reflector 31 is set surrounding the fuel assemblies 22. Furthermore, depending on the necessity, the MA reducing assemblies 23 are additionally loaded therein. As a measure to counter neutrons generated from MAs, a fast neutron control rod 140 is arranged depending on the necessity. On the other hand, the reducing assemblies 23, 24 are loaded in the second vessel 12. The MA reducing assemblies 23 are set in the inner part of the reducing assemblies, while the FP reducing assemblies 24 are set in the outer part of the reducing assemblies. Since high-energy neutrons are suitable to reduce MAs, the MA reducing assemblies 23 are arranged in the innermost part of the second vessel.

(Efficient Heat (Electricity) Generating System Using Radioactivity Reducing Second Vessel)

In the present invention, primarily, in the first vessel serving as the fast neutron region, the nuclear reactor generates thermal energy by being kept above criticality, and generates electrical output. As a fast neutron reactor, the nuclear reactor uses metal fuel rods. A fuel pin of a Zr—PU—U ternary alloy is inserted into a fuel rod sheath made of stainless steel. An alloy of this composition has been reported to cause a phase change in a range of 600° C. to 650° C., and to generate homogeneously-distributed noble gas components in the fuel while a nuclear reactor is in operation (Non Patent Literature 10). Because of this phase change and the existence of the noble gas, the fuel rod thermally expands in the order of several percent in the range of 600° C. to 650° C. This makes a risk of a runaway of the nuclear reactor with such fuel rods loaded therein very low. For the purpose of improving the heat transfer characteristics, metallic Na is filled between the sheath and the fuel pin. Furthermore, as a liquid metal at high temperature, metallic Na, Sn or PB—Bi is filled in this vessel.

To begin with, a basic system of the present invention will be hereinbelow described using FIG. 5. FIG. 5 illustrates the system which uses metallic Na as the primary coolant and supercritical $CO_2$ gas as the secondary coolant, and which generates electricity using a supercritical CO2 gas turbine. One vessel is used as the nuclear reactor vessel 1 and as the radioactivity reducing second vessel 12 at the same time. The first vessel 11 is put in the central part of the second vessel 12. The fuel assemblies 22 are loaded in the first vessel, and the reflector 31 deformable due to thermal expansion is arranged surrounding the fuel assemblies 22. The primary coolant is supplied into the first vessel from a primary coolant inlet 41, and is supplied to a main heat exchanger 7 from an outlet 42 via a supply line 46. After completing heat transfer, the primary coolant is re-supplied to the first vessel via a return line 47.

As the secondary coolant, supercritical $CO_2$ gas is filled into the second vessel from the return line 43. After heated by fast neutrons and the radioactivity reducing assemblies, the supercritical $CO_2$ gas is supplied to the heat exchanger 7 via the outlet line 44. This system makes the heat exchange efficiency much better since the supercritical $CO_2$ gas discharged from the turbine is preliminarily heated inside the nuclear reactor vessel 1.

The supercritical $CO_2$ gas heated in the nuclear reactor vessel 1 and by the main heat exchanger 7 rotates the supercritical $CO_2$ gas turbine 8 to generate electricity. A compressor 9 for compressing the $CO_2$ gas is connected to the turbine 8. After cooled by the heat exchanger again, the used $CO_2$ gas is supplied to the compressor 9, and is compressed thereby to turn into supercritical $CO_2$ gas. This supercritical $CO_2$ gas passes through the heat exchanger again, and is thereafter re-supplied to the second vessel 12 via a return line 51.

Next, descriptions will be provided for a case where instead of metallic Na, Pb—Bi is used as the primary coolant. In the case where Pb—Bi is used as the primary coolant, water is also usable as the secondary coolant. CO2 gas, however, can be used as the secondary coolant as well. As illustrated in FIG. 6A, a steam turbine 60 is usable instead of the $CO_2$ gas turbine 8. The use of the steam turbine 60 requires a condenser 61 instead of the compressor 9 and a cooler 52. With this taken into consideration, heaters 62, 63 are set for the purpose of: returning the steam into water; and heating the resultant water. In general, a large-scale steam turbine system uses a two-step heading system which includes the low-pressure heater 62 and the high-pressure heater 63. The system of the present invention is capable of performing two-step heating. Water heated by two steps like this is supplied to the second vessel 12 via the pipe 51 and the second vessel inlet 43 using a supply pump 36. The raw water heated in the second vessel is supplied to the main heat exchanger 7 from the second vessel outlet 44. Steam heated by the main heat exchanger 7 is supplied to the turbine 60. Since the raw water is thus preliminarily heated in the nuclear reactor before sent to the main heat exchanger, the thermal efficiency of the nuclear reactor can be made much better.

FIG. 6B illustrates another method in which Pb—Bi is used as the primary coolant. The first vessel 11 is arranged in the inner part of the nuclear reactor 1, and the second vessel 12 is arranged in the outer part of the nuclear reactor 1. The primary coolant, the fuel assemblies 22, the reflector 31 and a primary coolant natural convection acceleration cylinder 160 are arranged in the first vessel. Furthermore, depending on the necessity, the fast neutron absorber 140 is loaded in the first vessel. The FP reducing assemblies 24 are arranged in the second vessel, and the secondary coolant is supplied to the second vessel. In this embodiment, water is used as the secondary coolant. Heat generated from the FP reducing assemblies 24 and the fuel assemblies 22 is circulated between the nuclear reactor and the heat exchanger 7 using the secondary coolant circulation pump 36. An accumulator 59 is used to inhibit generation of steam from water as the secondary coolant. Steam generated by the heating by the heat exchanger 7 generates electricity in the turbine 60, and is thereafter returned into water in the condenser 61. The resultant water is re-supplied to the heat exchanger 7 by a supply pump 37, and is heated by the heat exchanger 7.

(Acceleration of β-Decay Rate)

In the present invention, the α-decay rate is accelerated by neutrons, as discussed above. Descriptions will be hereinbelow provided for a method of accelerating β-decay. For the purpose of accelerating the β-decay rate using an external field, as discussed above, the shielding effect of extranuclear electrons is reduced to a large extent, and the influence of the external electric and magnetic fields on nuclei is thereby increased. As a result, a nuclear reactor structure which increases the rate of decay of radioactive elements is provided. Basically, the following points are taken into consideration.

(1) Increase in elementary particle flux in which elementary particles neutrinos and muons) and neutrons coexist together, as well as increase in neutron flux, in order to accelerate the β-decay rate, but at low costs.

(2) Incorporation of a mechanism which is capable of reducing the shielding effect of extranuclear electrons.

(3) Capability of applying a low-frequency (1 kHz to 50 MHz) electromagnetic field.

In the present invention, a mechanism is incorporated to shorten half-life of β-decay of long-life radionuclides generated in the above-discussed nuclear reactor in addition to accelerating α-decay. Methods of accelerating β-decay are roughly classified into: methods based on transmutation into stable nuclei using neutron capture reaction; and methods based on perturbation theory in quantum mechanics. Among typical examples of methods using neutrons are a method using I129 and a method using Cs135. Through neutron capture, I129 transmutes eventually into stable Xe130, Likewise, Cs135 transmutes into stable Ba136. As discussed above, these neutron capture reactions are promoted in the thermal neutron region in the nuclear reactor. The present invention focuses on radionuclides which have relatively long half-life and undergo β-decay.

On the other hand, direct acceleration of β-decay is achieved by promoting β-decay of radionuclides by applying an electromagnetic field to the radionuclides, based on β-decay acceleration theory stemming from perturbation theory proposed by H. R. Reiss (Non Patent Literature 7). Basically, β-decay takes place when an excited nucleus transmutes into a stable nuclide. However, β-decay with long half-life is a forbidden transition from a viewpoint of quantum mechanics. Since β-decay with long half-life is a forbidden transition, half-life of decay becomes longer, and half-life of a radionuclide accordingly becomes longer. For the purpose of partially incorporating an allowed transition component into the forbidden transition, an electromagnetic field component at a low frequency of 50 kHz to 50 MHz is applied as a perturbation term. In addition to the application of this low-frequency electromagnetic field, an effect of synergy between elementary particles, such as neutrinos and muons, which are specific to the nuclear reactor (nuclear fission of each nuclide in the nuclear reactor generates six neutrinos) and high temperature of approximately 300° C. or higher can be expected.

FIG. 7 illustrates a method of applying a low-frequency electromagnetic field in the two-region nuclear reactor according to the present invention. The fast neutron region (first vessel) 11 is put into the thermal neutron region (second vessel) 12. The radioactivity reducing assemblies (FP reducing assemblies) 21 are loaded in the second vessel 12. On the other hand, the fuel assemblies 22, and the MA reducing assemblies 23 depending on the necessity, are loaded in the first vessel 11. The reflector 31 is arranged surrounding the fuel assemblies 22. Thereafter, a solenoid coil 123 is arranged surrounding the radioactivity reducing assemblies 21. A low-frequency electromagnetic field generated from an alternating-current magnetic field at a frequency in a range of 50 kHz to 50 MHz, preferably 100 kHz to 10 MHz, is applied. In this structure, the central magnetic field of the solenoid coil 123 is expressed with $$H/nI/2 \qquad \text{(Equation 2)}$$

where: H is the central magnetic field of the coil; n is the number of windings of the coil; and I is an electric current.

The solenoid coil basically aims to form the magnetic field. In the present invention, when an alternating current is made to flow through the solenoid coil, an alternating-current magnetic field is generated, and an electromagnetic field is generated in response to the alternating-current magnetic field. The electromagnetic field is referred to as a "low-frequency electromagnetic field from time to time.

To put it specifically, the configuration of the nuclear reactor system according to the present invention is as follows.

The nuclear reactor system includes a nuclear reactor vessel.

The nuclear reactor vessel includes: a first vessel serving as a region using fast neutrons; and a second vessel serving as a region using thermal neutrons in a nuclear reactor, energy of each thermal neutron being approximately 0.5 MeV or less.

The region using the fast neutrons includes: multiple fuel assemblies, each fuel assembly being a bundle of 50 or more metal fuel rods, each metal fuel rod being obtained by inserting a metal fuel pin into a sheath made of stainless steel, the metal fuel pin having an alloy composition of zirconium (Zr) with uranium (U) and/or plutonium (Pu); and a liquid metal working as a primary coolant.

A non-metallic material and radioactivity reducing assemblies are loaded in the region using the thermal neutrons. The non-metallic material is usable as a neutron moderator and as a secondary coolant. Each radioactivity reducing assembly is obtained by putting a radioactive material into a sheath made of stainless steel or Zr material. The radioactive material is obtained by processing minor actinide nuclides separated from spent fuel rods through reprocessing, or radionuclides as nuclear fission products, into a shape of a pellet or a pin.

The nuclear reactor system is configured to generate electricity by: transferring thermal energy generated by the fast neutrons to a heat exchanger by use of the primary coolant; exchanging heat between the primary coolant and the secondary coolant in the heat exchanger; and thereafter supplying the thermal energy to a turbine system by use of the secondary coolant, as well as to simultaneously decrease a concentration of radionuclides by accelerating a rate of transmutation of radionuclides into stable nuclides by use of thermal neutrons generated by decelerating the fast neutrons.

Furthermore, the nuclear reactor system according to the present invention uses metallic sodium (Na) as the primary coolant for the fuel assemblies, and carbon dioxide gas ($CO_2$) as the secondary coolant for the radioactivity reducing assemblies. Carbon dioxide gas works as the coolant and as the moderator. The nuclear reactor system further includes a $CO_2$ gas driven turbine. Moreover, in a case where the nuclear reactor system uses Pb—Bi or Sn as the primary coolant, the nuclear reactor system can employ light water as the secondary coolant. Like carbon dioxide gas, light water is usable as the moderator as well. In the case where the nuclear reactor system uses light water as the secondary coolant, the nuclear reactor system uses a steam turbine instead of the $CO_2$ gas driven turbine.

In addition, the nuclear reactor system according to the present invention enhances heat exchange efficiency by: once supplying the $CO_2$ gas or the light water, returning from the turbine system, to the radioactivity reducing second vessel; and thereafter supplying the $CO_2$ gas or the light water to the heat exchanger for transferring heat between the primary coolant and the secondary coolant.

Moreover, the nuclear reactor system according to the present invention uses lead-bismuth (Pb—Bi) or Pb alone as the primary coolant for the fuel assemblies, and water ($H_2O$) as the secondary coolant concurrently working as a moderator for the reducing assemblies. The nuclear reactor system further includes a steam turbine.

Besides, the nuclear reactor system according to the present invention enhances the heat exchange efficiency by: supplying $H_2O$, returning from the turbine system, to the second vessel in which the radioactivity reducing assemblies are loaded; and thereafter supplying the $H_2O$ to the heat exchanger for transferring heat between the primary coolant and the secondary coolant.

In addition, the nuclear reactor system according to the present invention uses a pellet or a pin as each radioactivity reducing assembly to be loaded in the second vessel. As radioactive nuclear fission products (FPs) separated and refined from the spent nuclear fuel, at least one selected from the group consisting of Se79, Sr90, Zr93, Tc99, Sn126, Cs135 and Cs137 is mixed into the pellet or the pin. The nuclear reactor system efficiently accelerates the rate of transmutation of radionuclides into stable nuclides by bombarding the radioactivity reducing assembly with the thermal neutrons each with energy of 0.5 MeV or less, and thereby decreases the concentration of the radionuclides.

Furthermore, in the nuclear reactor system according to the present invention, the second vessel for the thermal neutrons is placed inside the first vessel for the fast neutrons.

Moreover, in the nuclear reactor system according to the present invention, the first vessel for the fast neutrons is placed inside the second vessel for the thermal neutrons.

Besides, the nuclear reactor system according to the present invention uses a supercritical carbon dioxide ($CO_2$) gas or light water as the secondary coolant.

In addition, in the nuclear reactor system according to the present invention, the reflector is arranged surrounding the multiple fuel assemblies loaded in the first vessel. The reflector is deformable due to thermal expansion. The reflector has a structure which makes temperature and reflector efficiency inversely correlated to each other. The reflector is capable of automatically controlling nuclear fission reaction induced by the fast neutrons.

Furthermore, in the nuclear reactor system according to the present invention, a structure of the reflector uses carbon (C) or beryllium (Be) as a constituent material; the reflector is divided into four or more segments in a circumferential direction; a spring made of stainless steel with a large thermal expansion coefficient or a bimetal using two metal plates with different thermal expansion coefficients is attached to each reflector segment, the two metal plates being obtained by adding manganese, chromium, copper and the like to an alloy of iron and nickel; and the structure of the reflector is configured to decrease reflection efficiency depending on thermal expansion of the spring with a rise in temperature.

Moreover, in the nuclear reactor system according to the present invention, a structure of the reflector is divided into segments in a radial direction and in a height direction; each reflector segment is formed by filling graphite or carbon into a case made of stainless steel; each two reflector segments are connected by stainless steel, or a bimetal using two metal plates with different thermal expansion coefficients, the two metal plates being obtained by adding manganese, chromium, copper and the like to an alloy of iron and nickel; and the structure of the reflector is configured to be capable of decreasing neutron reflection efficiency of the reflector depending on thermal expansion of the stainless steel.

Besides, in the nuclear reactor system according to the present invention, a solenoid coil is arranged surrounding the radioactivity reducing assemblies which are loaded in the second vessel, and the nuclear fission products (FPs) are mixed into each radioactivity reducing assembly. The nuclear reactor system is configured to accelerate a rate of β-decay of the radioactive nuclear fission products by: generating a low-frequency electromagnetic field at a frequency of 50 kHz to 50 MHz; and concurrently applying the thermal neutrons to the radioactivity reducing assemblies. The thermal neutrons are obtained by decelerating the fast neutrons which are generated in the first vessel outside the second vessel.

In addition, in the nuclear reactor system according to the present invention, solenoid-shaped winding is arranged along a radial circumference of the second vessel, and the radioactivity reducing assemblies into which the radioactive nuclear fission waste is mixed are loaded in the second vessel. The nuclear reactor system is configured to accelerate a rate of transmutation of minor actinide elements into stable elements by: applying a low-frequency electromagnetic field at a frequency of 100 kHz to 10 MHz to the radioactivity reducing assemblies; and further irradiating the inside of the first vessel placed in the second vessel with thermal neutrons which are generated from a reactor core including the reflector.

The first vessel is formed in the shape of a cylinder with a diameter of 2 m or less. Each fuel assembly to be contained in the nuclear reactor vessel includes 50 or more fuel rods, each of which is formed with a diameter of 5 to 15 mm and with a length of 3 m or less. Six or more fuel assemblies are loaded in the first vessel. The reflector deformable due to thermal expansion is arranged surrounding the fuel assemblies in order to realize a load following control scheme.

Furthermore, a fuel pin into which minor actinide elements are mixed is inserted into each fuel rod sheath in the fuel assemblies, and the nuclear reactor system according to the present invention is thereby configured to accelerate transmutation of radioactive minor actinide nuclides into stable nuclides by use of the fast neutrons.

Moreover, in the nuclear reactor system according to the present invention, the diameter of the nuclear reactor vessel is 2 m or greater; two or more first vessels serving as the fast neutron region and two or more second vessels serving as the thermal neutron region are set in the vessel; the metal fuel assemblies are loaded in each first vessel, and each first vessel is filled with the primary coolant of liquid metal; and the reducing assemblies containing minor actinides and/or nuclear fission waste are loaded in each second vessel. The nuclear reactor system removes heat from the vessel and the reducing assemblies containing the radioactive waste by making the secondary coolant flow in the vessel and the reducing assemblies, and further uses the heat to generate electricity.

Meanwhile, the present invention provides the following method as well.

The method includes:

in a nuclear reactor system, forming a nuclear reactor vessel from a first vessel serving as a region using fast neutrons, and a second vessel serving as a region using thermal neutrons, energy of each thermal neutron being approximately 0.5 MeV or less;

arranging multiple fuel assemblies and a liquid metal in the region using the fast neutrons, each fuel assembly being a bundle of 50 or more metal fuel rods, each metal fuel rod being obtained by inserting a metal fuel pin into a sheath made of stainless steel, the metal fuel pin having an alloy composition of zirconium (Zr) with uranium (U) and/or plutonium (Pu), the liquid metal working as a primary coolant;

loading a non-metallic material and radioactivity reducing assemblies in the region using the thermal neutrons, the non-metallic material being usable as a neutron moderator and as a secondary coolant, each radioactivity reducing assembly being obtained by putting a radioactive material into a sheath made of stainless steel or Zr material, the radioactive material being obtained by processing minor actinide nuclides separated from spent fuel rods through reprocessing, or radionuclides as nuclear fission products, into a shape of a pellet or a pin.

The method generates electricity by: transferring thermal energy generated by the fast neutrons to a heat exchanger by use of the primary coolant; exchanging heat between the primary coolant and the secondary coolant in the heat exchanger; and thereafter supplying the thermal energy to a turbine system by use of the secondary coolant, as well as simultaneously decreases a concentration of radionuclides by accelerating a rate of transmutation of radionuclides into stable nuclides by use of thermal neutrons generated by decelerating the fast neutrons.

In addition, the method according to the present invention uses metallic sodium (Na) as the primary coolant for the fuel assemblies, and carbon dioxide gas ($CO_2$) or light water as the secondary coolant for the radioactivity reducing assemblies. The carbon dioxide gas or the light water works as the coolant and as the moderator. The method uses a $CO_2$ gas driven turbine or a steam turbine.

Furthermore, the method according to the present invention enhances heat exchange efficiency by: once supplying the $CO_2$ gas, returning from the turbine system, to the radioactivity reducing second vessel; and thereafter supplying the $CO_2$ gas to the heat exchanger for transferring heat between the primary coolant and the secondary coolant.

Moreover, the method according to the present invention uses lead-bismuth (Pb—Bi), Pb alone or Sn as the primary coolant for the fuel assemblies, and water ($H_2O$) as the secondary coolant concurrently working as a moderator for the reducing assemblies. The method uses a steam turbine.

Besides, the method according to the present invention enhances heat exchange efficiency by: supplying $H_2O$, returning from the turbine system, to the second vessel in which the radioactivity reducing assemblies are loaded; and thereafter supplying the $H_2O$ to the heat exchanger for transferring heat between the primary coolant and the secondary coolant.

In addition, the method according to the present invention uses a pellet or a pin as each radioactivity reducing assembly to be loaded in the second vessel, and as radioactive nuclear fission products (FPs) separated and refined from the spent nuclear fuel, at least one selected from the group consisting of Se79, Sr90, Zr93, Tc99, Sn126, Cs135 and Cs137 is mixed into the pellet or the pin. The method efficiently accelerates the rate of transmutation of radionuclides into stable nuclides by irradiating the radioactivity reducing assemblies with thermal neutrons each with energy of 0.5 MeV or less, and thereby decreases the concentration of the radionuclides.

Furthermore, in the method according to the present invention, a solenoid coil is arranged surrounding the radioactivity reducing assemblies which are loaded in the second vessel, and the nuclear fission products (FPs) are mixed into each radioactivity reducing assembly. The method accelerates a rate of β-decay of the radioactive nuclear fission products by: generating a low-frequency electromagnetic field at a frequency of 50 kHz to 50 MHz; and concurrently applying the thermal neutrons to the radioactivity reducing assemblies, the thermal neutrons being obtained by decelerating the fast neutrons which are generated in the first vessel outside the second vessel.

Moreover, in the method according to the present invention, solenoid-shaped winding is arranged along a radial circumference of the second vessel, and the radioactivity reducing assemblies into which the radioactive nuclear fission waste is mixed are loaded in the second vessel. The method accelerates a rate of transmutation of FP elements into stable elements by: applying a low-frequency electromagnetic field at a frequency of 100 kHz to 10 MHz to the radioactivity reducing assemblies; and further bombarding an inside of the first vessel placed in the second vessel with thermal neutrons which are generated from a reactor core including the reflector.

Besides, the method according to the present invention performs load following control by: forming the first vessel in the shape of a cylinder with a diameter of 2 m or less; using 50 or more fuel rods, each formed with a diameter of 5 to 15 mm and with a length of 2 m or less, in each fuel assembly to be contained in the nuclear reactor vessel; loading six or more fuel assemblies in the first vessel; and arranging the reflector deformable due to thermal expansion to surround the fuel assemblies.

In addition, the method according to the present invention accelerates transmutation of radioactive minor actinide elements into stable elements by use of fast neutrons by inserting a fuel pin, into which minor actinide elements are mixed, into each fuel rod sheath in the fuel assemblies.

Advantageous Effects of Invention

A nuclear reactor system can be realized which, while generating electricity, is capable of promoting nuclear transmutation of long-life radioactive nuclides, such as radioactive nuclear fission products, into stable nuclides, and increasing the rate of decay of relatively short-life radioisotope nuclides.

DESCRIPTION OF EMBODIMENTS

Embodiment 1

Figure 1:
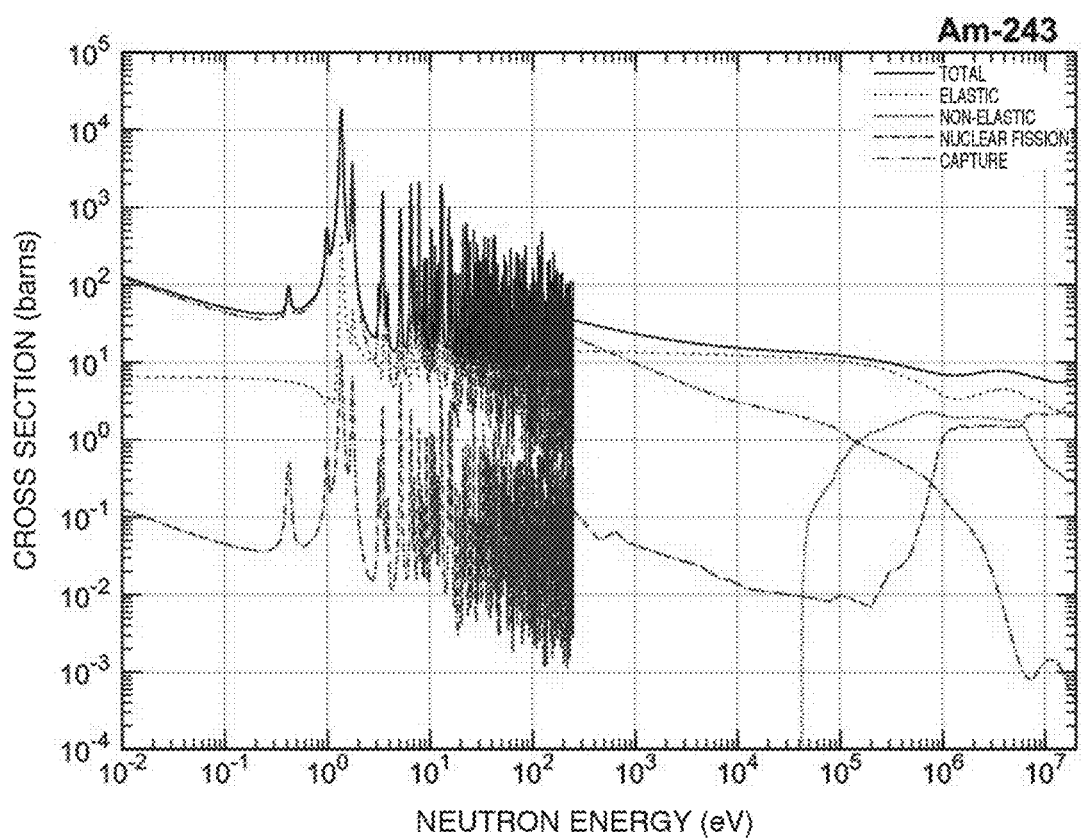
FIG. 1 is a graph showing dependency of the neutron capture cross section of Am243, one of the minor actinide elements, on neutron energy.
Figure 2A:
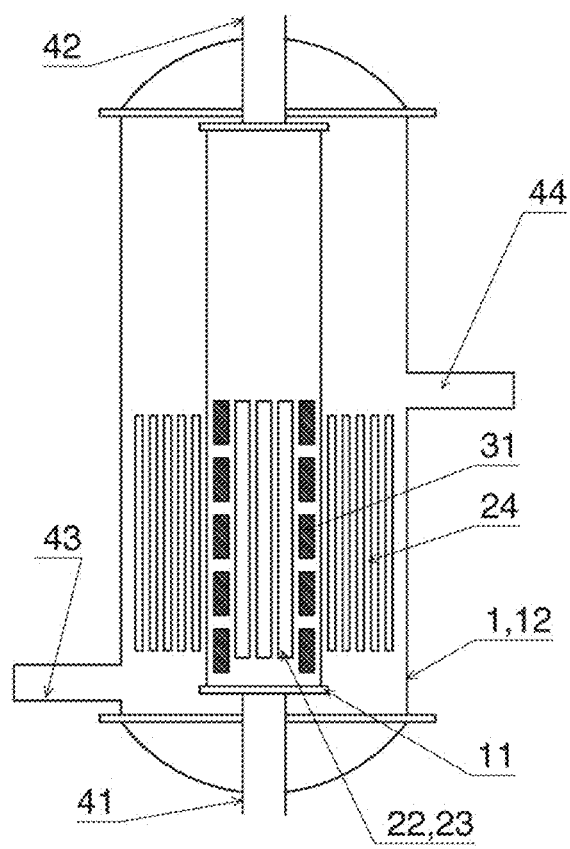
FIG. 2A is a schematic cross-sectional diagram of a nuclear reactor according to the present invention with a fast neutron region arranged inside a thermal neutron region.
Figure 2B:
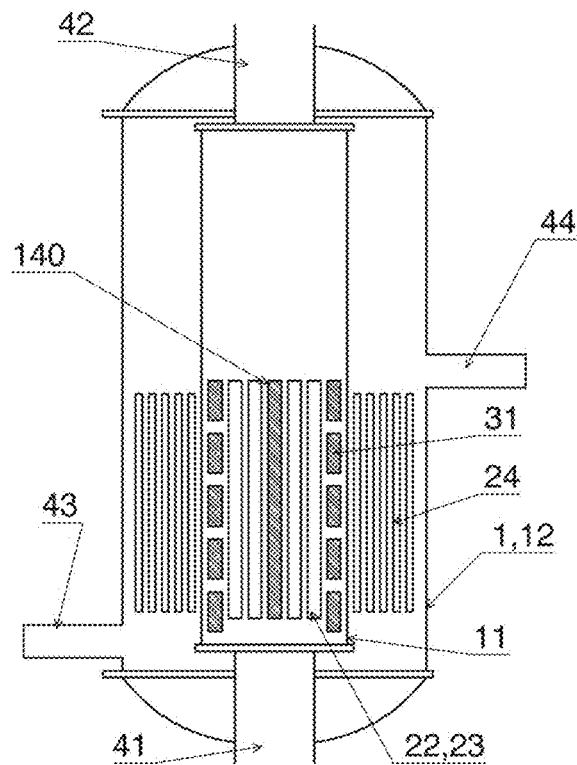
FIG. 2B is a schematic cross-sectional diagram of another nuclear reactor according to the present invention with the fast neutron region arranged inside the thermal neutron region.
Figure 2C:
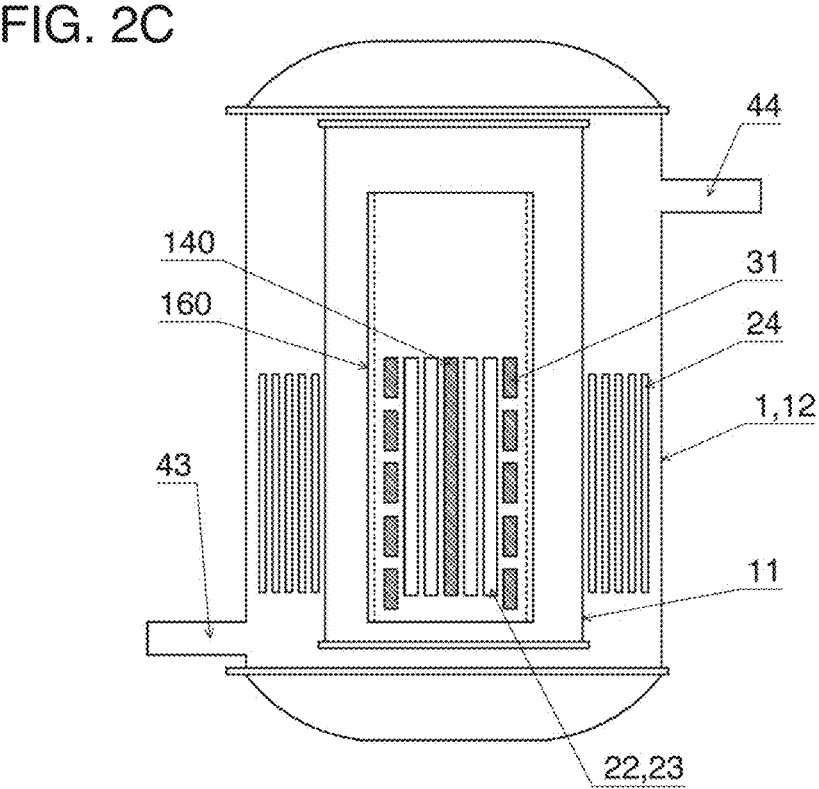
FIG. 2C is a schematic cross-sectional diagram of yet another nuclear reactor according to the present invention with the fast neutron region arranged inside the thermal neutron region.

Nuclear reactors illustrated in FIGS. 2A and 2B each have a structure in which a second vessel 12 serving as a thermal neutron region is placed outside a first vessel 11 serving as a fast neutron region. Main components inside the first vessel 11 are fuel assemblies 22 and a reflector 31. A nuclear reactor core inside the first vessel includes 24 assemblies of fuel rods. Each fuel rod is obtained by: enclosing a metal fuel pin in a cladding tube made of ferritic stainless steel or chrome molybdenum steel; and filling metallic Na between the fuel pin and the cladding tube for the purpose of enhancing heat transfer characteristics. The metal fuel pin is made of an alloy of zirconium (Zr), U(235, 238) and Pu239; or an alloy of Zr and either of U(235, 238) and Pu239. In this respect, cadmium (Cd), tin (Sn), cesium (Cs) or the like may be used instead of metallic Na. The first vessel is formed in the shape of a cylinder with a diameter of 2 m or less and with an effective height of approximately 20 m or less for loading the fuel rods. Radioactivity reducing rods 23, 24 are loaded in the second vessel 12.

Figure 3:
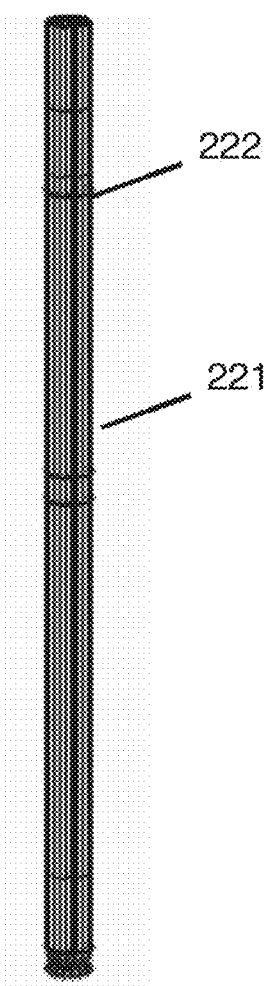
FIG. 3 illustrates a structure of a fuel assembly according to the present invention.
Figure 4:
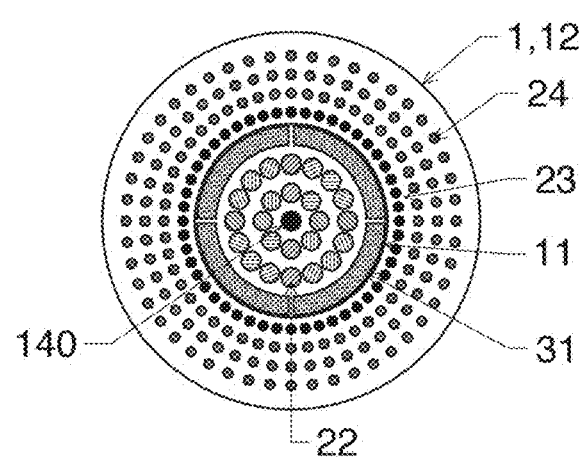
FIG. 4 illustrates an example of how fuel assemblies and radioactivity reducing assemblies (MA reducing assemblies and FP reducing assemblies) are arranged when loaded in the thermal neutron region (second vessel) and the fast neutron region (first vessel) set in the second vessel according to the present invention.

A metal fuel pin contained in one metal fuel rod illustrated in FIG. 3, which is used in the present invention, is made of an alloy of Zr, U(235, 238) and Pu239, and its enrichment is 19%. The metal fuel pin is formed in the shape of a rod with a diameter of 10 mm or less and with a height of 10 cm or more. This metal fuel pin is enclosed in a cladding tube made of ferritic stainless steel to form a fuel rod 221. The cladding tube in which to enclose the metal fuel pin is formed in the shape of an elongated cylinder with a diameter of 10 mm or less and with a length of 3 m. The effective nuclear fission length of the metal fuel rod is approximately 1.5 m. 150 fuel rods are bundled to form one fuel assembly. Since each fuel assembly 22 includes 150 fuel rods each with a length of approximately 1.5 in, the fuel assembly 22 is almost as long as the fuel rods, and is almost 1.5 m. Thereafter, the fuel assemblies 22 each with a height of approximately 1.5 m are loaded in the bottom part of the first vessel 11 with a height H1 of 20 m or less. Thus, a space with a height of 3 to 5 in is provided in the upper part of the first vessel 1, as illustrated in FIGS. 2A and 2B.

Figure 8A:
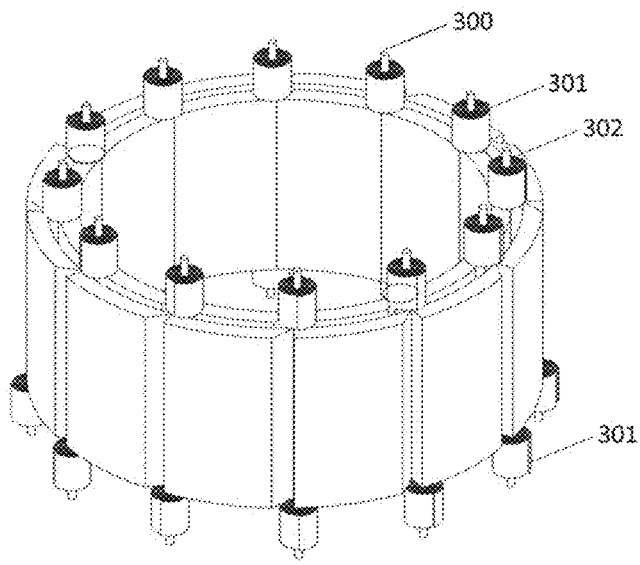
FIG. 8A is a perspective diagram of how a segmented reflector according to the present invention works while temperature of a reactor core is low
Figure 8B:
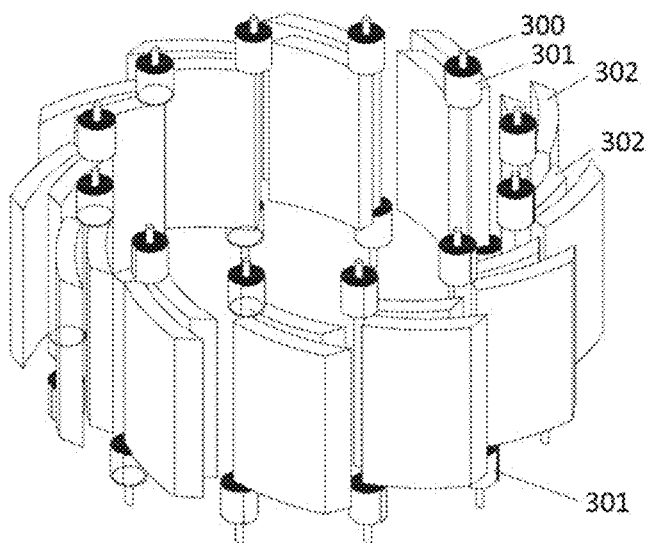
FIG. 8B is a perspective diagram of how the segmented reflector according to the present invention works while temperature of the reactor core is high.

The reflector 31 has a structure similar to that of a thermal expansion deformable reflector used in the small-size load-following nuclear reactor (Patent Literature 3). This embodiment uses a 12-segmented reflector 31 illustrated in FIGS. 8A and 8B. The reflector 31 has a structure in which: each reflector segment 302 is supported by a rod 300; and a spring-shaped bimetal 301 is attached to the support rod 300. A stainless steel-made container of the reflector segment is filled with graphite carbon. Beryllium, or tungsten carbide may be used instead of graphite carbon. While the temperature of the nuclear reactor core is low, the reflector segments are closed as illustrated in FIG. 8A. Conversely, while the temperature of the nuclear reactor core is high, the reflector segments are opened as illustrated in FIG. 8B, and decreases the neutron reflection efficiency. Use of the reflector segments like this makes it possible to control the temperature of the reactor core automatically. The critical characteristics can be checked using a calculation code CITATION.

Figure 9:
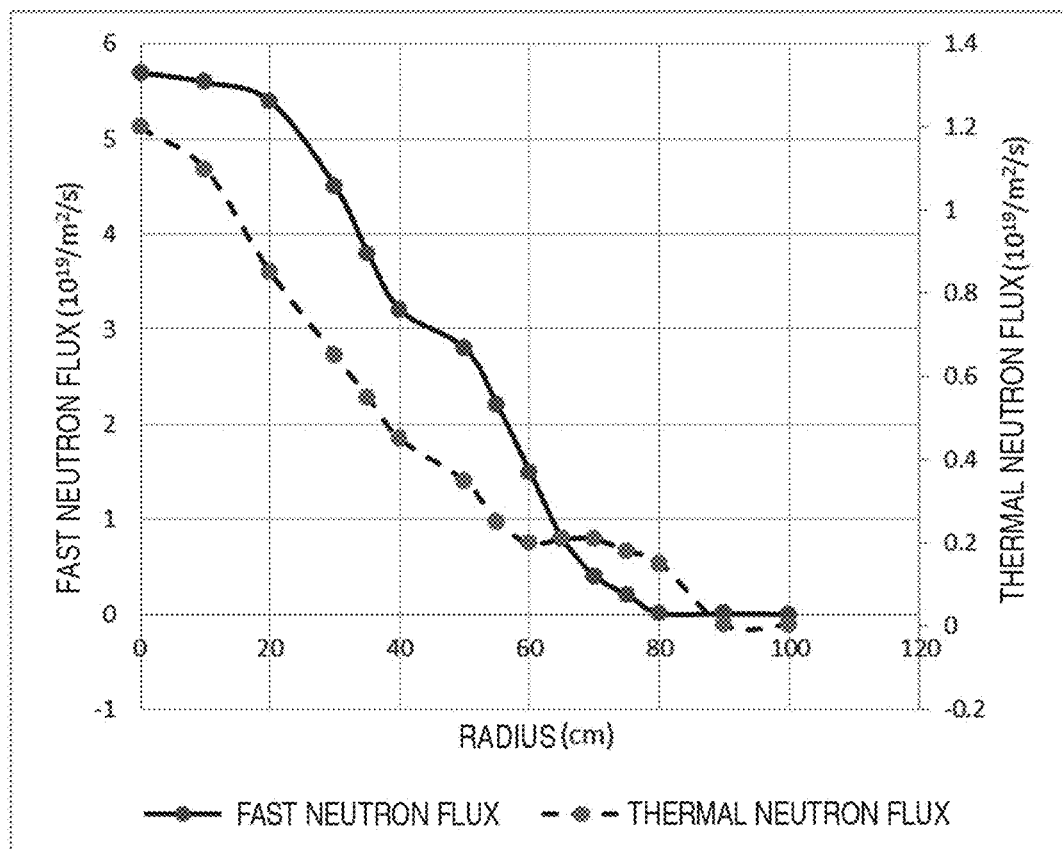
FIG. 9 is a graph illustrating how fast neutron flux and thermal neutron flux are distributed in a radial direction from the reactor core in the nuclear reactor with the first vessel set in the second vessel.

In a case where Cm242 and Am243, neutron emitting elements, are contained in MAs which are added to the radioactivity reducing rods to be loaded in the thermal neutron region in the second vessel, there is likelihood that: excessive neutrons are released; and the critical characteristics is disturbed. With this taken into consideration, a control rod 140 for absorbing excessive neutrons is loaded in the first vessel. Neutron distributions were calculated in order to check effects of the present invention, and FIG. 9 illustrates the result of the calculation. The radius of each of the fuel assemblies loaded in the first vessel was at 35 cm, and the thickness of the reflector was at 10 cm. Furthermore, a moderator/coolant was supplied into the second vessel. The setting of the fast neutron region at the reactor center and the setting of the thermal neutron region outside the fast neutron region decrease the attenuation of thermal neutron flux inside the second vessel.

Embodiment 2

As discussed in Patent Literature 3, dry reprocessing is among effective methods of processing spent metal fuel rods. Spent metal fuel is electrolytically refined in high-temperature LiCl—KCl molten salt at approximately 500° C. Thereby, U and Pu as nuclear fuel are separated from MAs and FPs as transuranic elements. In the electrolytic refining process, U and Pu precipitate due to reduction reaction of the cathode electrode using Fe or Cd, while parts of MAs simultaneously precipitate and at maximum 10% of MAs mix into U and Pu since the chemical properties of MAs are relatively close to those of U and Pu. Like this, it is difficult to separate U and Pu from MAs completely. Thus, MAs mix in each metal fuel pin containing U and Pu as main components. Accordingly, MA components are contained in each fuel assembly.

In the basic dry reprocessing, separated MAs are eventually transmuted into oxide which is easy-to-store waste. The MAs in an oxide state are inserted into a stainless steel cylindrical container with an inner diameter of 10 mm to 150 mm. In a case where the inner diameter is 30 mm or less, MAs are aggregated into an assembly, and are thus loaded in the second vessel 12. Meanwhile, FPs are highly likely to remain in the molten salt, and the molten salt in which FPs are mixed is filtered using a zeolite filler. The filter used to filter the FPs is eventually glass-solidified. Like the MAs, the glass-solidified FPs are inserted into the stainless steel cylindrical container with a height of 3 m and with an inner diameter of 10 mm to 150 mm. In a case where the inner diameter is 30 mm or less, FPs are aggregated into an assembly, and are thus loaded in the second vessel 12. As shown in Embodiment 3 given below, since the FPs loaded therein are in the glass-solidified state, the FPs are suitable for the application of a low-frequency electromagnetic field.

Embodiment 3

Figure 10:
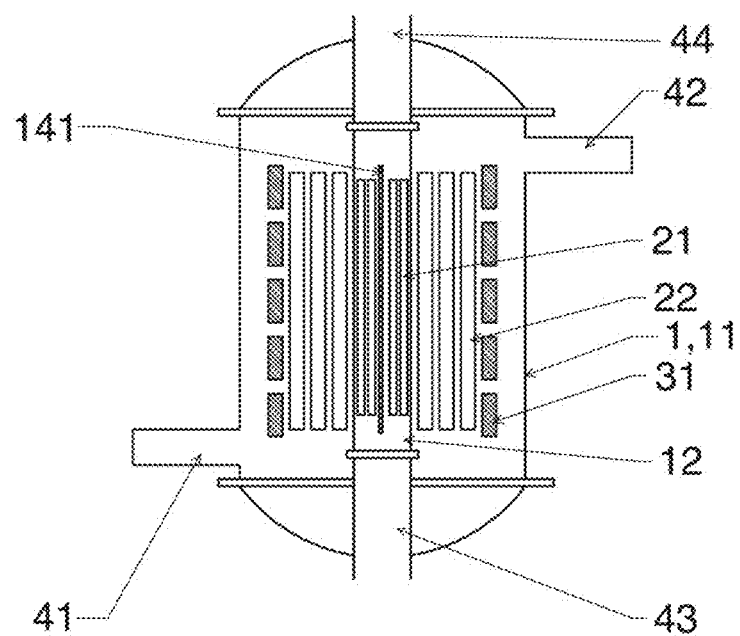
FIG. 10 is a schematic cross-sectional diagram of a nuclear reactor according to the present invention in which the second vessel serving as the thermal neutron region is set in the first vessel serving as the fast neutron region.
Figure 11:
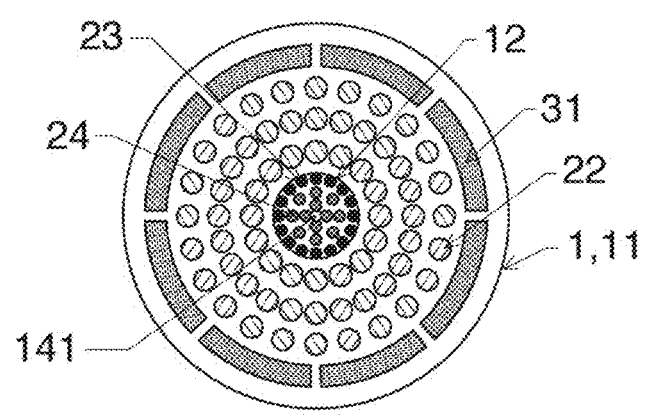
FIG. 11 illustrates an example of how fuel assemblies and radioactivity reducing assemblies (MA reducing assemblies and FP reducing assemblies) are arranged when loaded in the fast neutron region (first vessel) and the thermal neutron region (second vessel) set in the first vessel according to the present invention.

In FIG. 10, the first vessel 11 serving as the fast neutron region is set outside the second vessel 12 serving as the thermal neutron region. The fuel assemblies 22 are loaded in the first vessel 11, and the reflector 31 is set surrounding the fuel assemblies 22. Furthermore, as a measure to counter neutrons generated from MAs, a fast neutron control rod 141 is arranged depending on the necessity. Meanwhile, reducing assemblies 21 are loaded in the second vessel 12. As illustrated in FIG. 11, the MA reducing assemblies 24 are set in the inner part of the reducing assemblies 21, while the FP reducing assemblies 23 are set in the outer part of the reducing assemblies 21. Since high-energy neutrons are suitable to reduce MAs, the MA reducing assemblies 24 are set in the innermost part of the second vessel.

Figure 12:
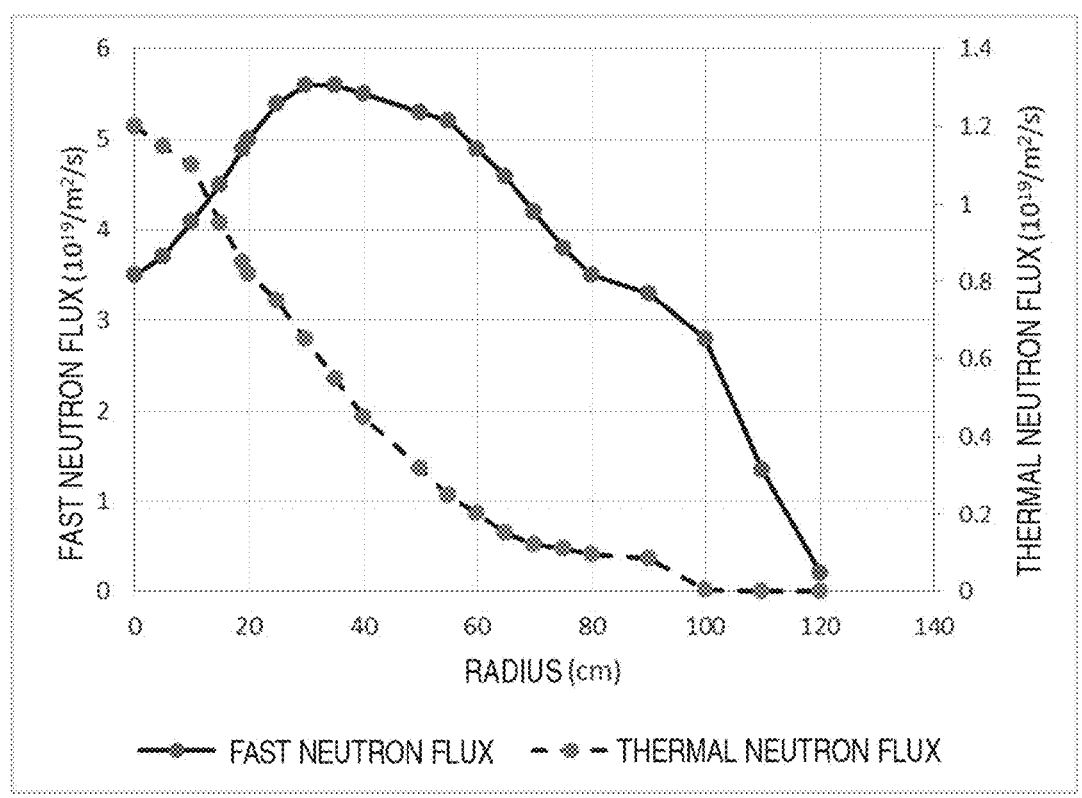
FIG. 12 is a graph illustrating how fast neutron flux and thermal neutron flux are distributed in a radial direction from the reactor core with the first vessel set in the second vessel according to the present invention.

In the meanwhile, the fuel assemblies 22 are loaded in the first vessel. The outer radius of the group of the fuel assemblies is at 60 cm, and the reflector 31 is provided outside the group of the fuel assemblies. FIG. 12 shows results of calculating the neutron distributions in this reactor core structure. As learned from FIG. 12, the fast neutron flux becomes lower in the second vessel as the nuclear reactor central region, while the thermal neutron flux is largest at the nuclear reactor central part. This is suitable to accelerate half-life of radioactivity in MAs and FPs.

Embodiment 4

Figure 13:
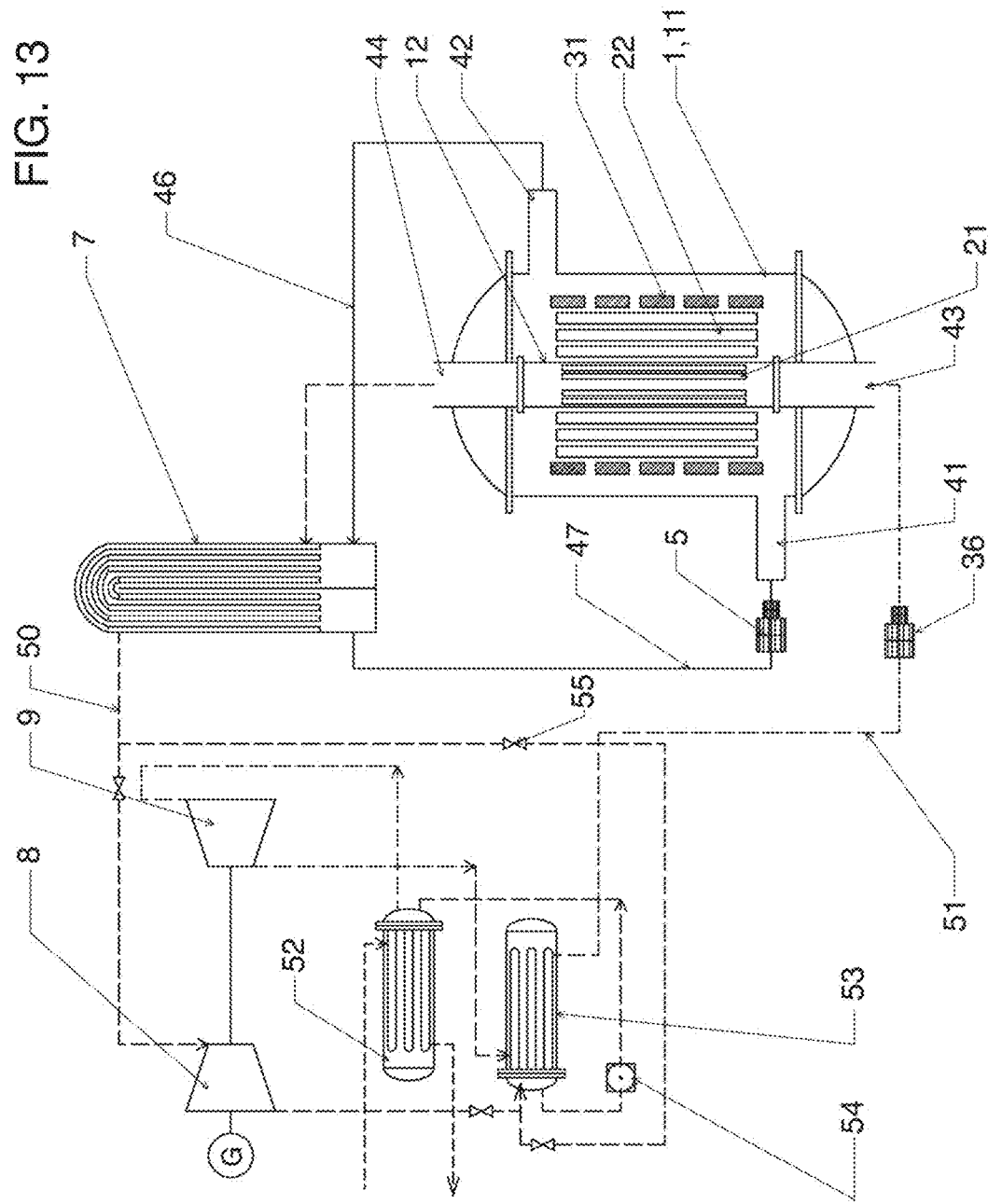
FIG. 13 is a schematic diagram of a small-scale nuclear reactor system according to the present invention in which the second vessel with fuel assemblies loaded therein is placed inside the first vessel.

FIG. 13 illustrates a system which includes the second vessel 12 inside the first vessel 11 as the nuclear reactor vessel. In this system, the fuel assemblies 22 are loaded in the first vessel 11, and the reactor 31 is arranged surrounding the fuel assemblies 22. Metallic Na is filled into the vessel 11 from an inlet 41 using a circulation pump 5 set in a primary coolant supply line 47, and the primary coolant is sent from an outlet 42 to a main heat exchanger 7 via a primary coolant return line 46.

The radioactivity reducing assemblies 21 are loaded in the second vessel 12. As the secondary coolant, supercritical $CO_2$ is supplied from a second vessel inlet 43 to the second vessel 12 via a secondary coolant supply line 51 using a circulation pump 36. The secondary coolant, as heated by the radioactivity reducing assemblies 21, is sent from a vessel outlet 44 to the main heat exchanger 7. The secondary coolant, as further heated by the main heat exchanger 7, is sent to a supercritical $CO_2$ turbine 8, and rotates the gas turbine 8 to generate electricity. A compressor 9 for compressing the $CO_2$ gas is connected to the gas turbine 8. The used $CO_2$ gas is cooled while passing through the regenerative heat exchanger 53 and the cooler 52. Thereafter, the resultant $CO_2$ gas is supplied to and compressed by the compressor 9, and is turned into supercritical $CO_2$ gas. The supercritical $CO_2$ gas is beforehand heated by the regenerative heat exchanger 53, and is thereafter re-sent to the second vessel 12 via the supply line 51 using the circulation pump 36.

Next, descriptions will be provided for a case where as the primary coolant, Pb—Bi is used instead of metallic Na.

Figure 6A:
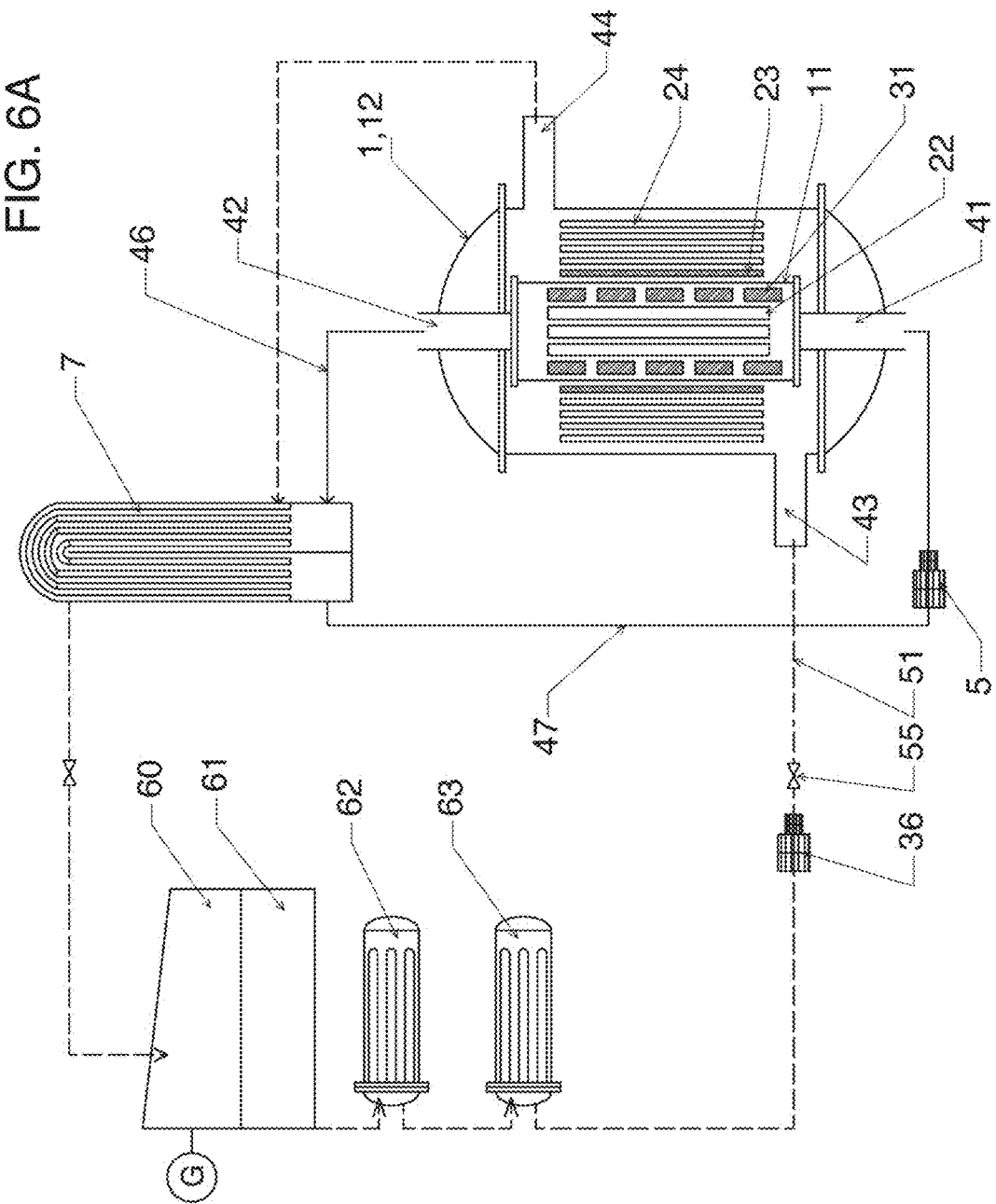
FIG. 6A illustrates a nuclear reactor system according to the present invention which uses Pb—Bi or Sn as the primary coolant, and water as the secondary coolant.
Figure 6B:
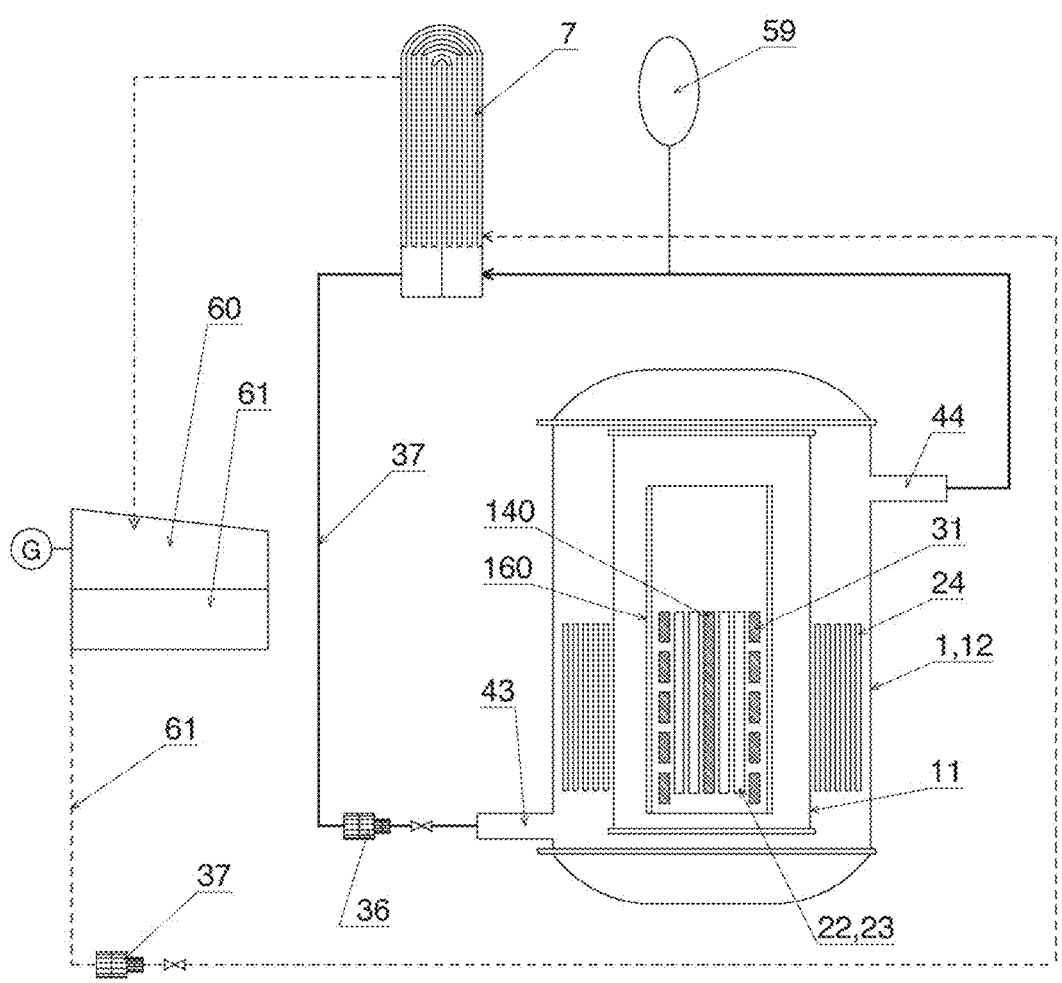
FIG. 6B illustrates a nuclear reactor system according to the present invention which uses Pb—Bi as the primary coolant to undergo natural convection, and water as the secondary coolant.

In the case where Pb—Bi is used as the primary coolant, water is also usable as the secondary coolant. Still, however, $CO_2$ gas is usable as the secondary coolant. The basic system is the same as what has been discussed using FIG. 6. A steam turbine 60 is usable instead of the $CO_2$ gas turbine 8. In the case where the steam turbine is used, a condenser 61 is needed instead of the compressor 9 and the cooler 52. With this taken into consideration, heaters 62, 63 are set for the purpose of: returning the steam into water, and heating the resultant water. In general, a large-scale steam turbine system uses a two-step heading system which includes the low-pressure heater 62 and the high-pressure heater 63. The system of the present invention is capable of performing two-step heating using these heaters and the radioactivity reducing second vessel 12. Water heated by two steps like this is supplied to the main heat exchanger 7, and generates steam.

Embodiment 5

Figure 14:
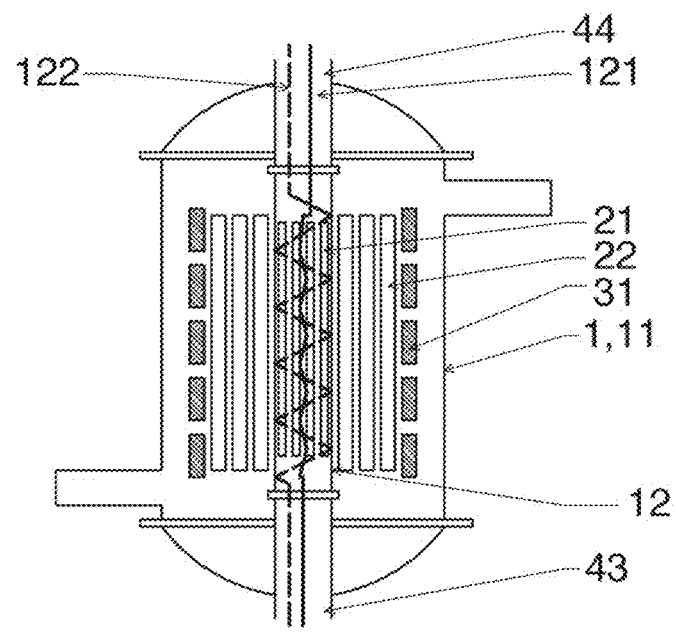
FIG. 14 is a diagram illustrating how a solenoid coil is arranged relative to the second vessel with reducing assemblies loaded therein when the second vessel is set inside the first vessel according to the present invention.

Descriptions will be provided for a method of applying a low-frequency electromagnetic field in a two-region nuclear reactor according to Embodiment 4 as refer to FIG. 14. The thermal neutron region (second vessel) 12 is put into the fast neutron region (first vessel) 11, and the radioactivity reducing assemblies (MA reducing assemblies and FP reducing assemblies) 21 are loaded in the second vessel 12. Meanwhile, the fuel assemblies 22 are loaded in the first vessel 11. The reactor 31 is arranged surrounding the fuel assemblies 22. Thereafter, an inner shell solenoid coil 121 and an outer shell solenoid coil 122 are arranged surrounding the radioactivity reducing assemblies 21. A low-frequency electromagnetic field generated from an alternating-current magnetic field of 10 kHz to 100 MHz, preferably 50 kHz to 50 MHz is applied.

Figure 7:
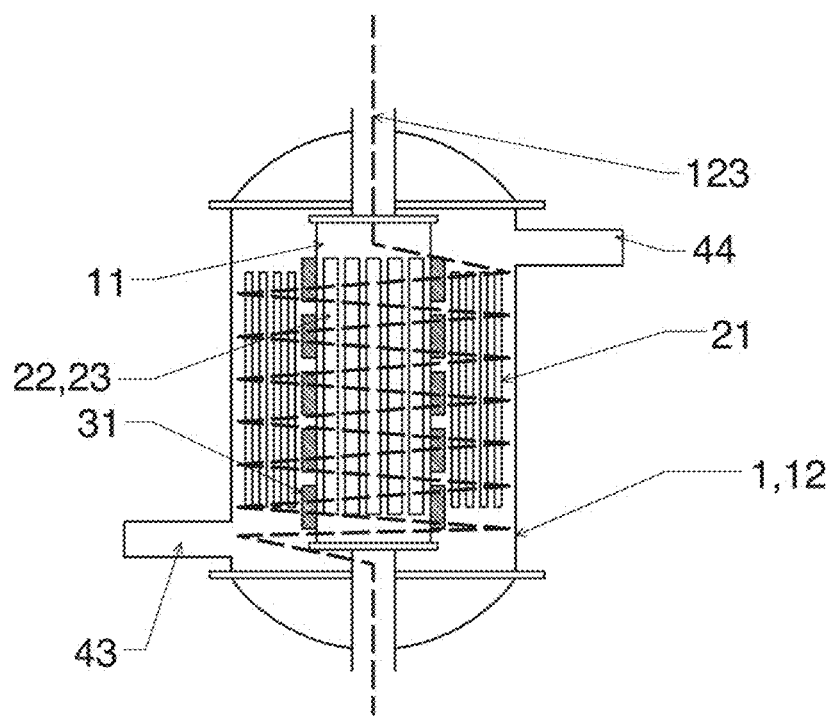
FIG. 7 is a schematic cross-sectional diagram of a nuclear reactor according to the present invention which is capable of reducing radioactivity by applying a low-frequency electromagnetic field.

Conversely, in the case where the first vessel is set in the second vessel, the method of applying the low-frequency electromagnetic field in the two-region nuclear reactor is the same as illustrated in FIG. 7. In this case, the solenoid coil is arranged throughout the reactor core.

Embodiment 6

Figure 15:
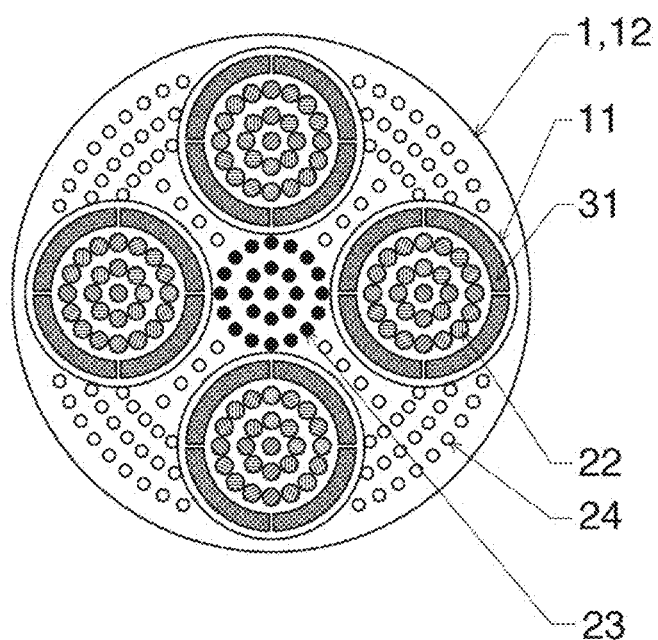
FIG. 15 is a schematic transverse cross-sectional diagram of a nuclear reactor according to the present invention with multiple first vessels arranged in the second vessel.

An object of the present invention is basically to establish a load following control-type reactor core (Patent Literature 3). Thus, the dimension of the group of the fuel assemblies to be loaded in the first vessel is limited. Accordingly, the arranging of two or more first vessels in one nuclear reactor vessel with a large dimension is effective to increase output from the nuclear reactor. FIG. 15 illustrates an embodiment in Which four first vessels each with the fuel assemblies loaded therein are arranged in the nuclear reactor 1. The four first vessels 11 are arranged inside the nuclear reactor vessel 1. The fuel assemblies 22 and the reflector 31 are provided in each first vessel. Inside the second vessel, meanwhile, the MA reducing assemblies 23 are loaded in the central part of the second vessel, while the FP reducing assemblies 24 are loading in the peripheral part of the second vessel. The employment of the arrangement of the radioactivity reducing assemblies like this enhances efficiency of utilization of thermal neutrons.

Figure 16:
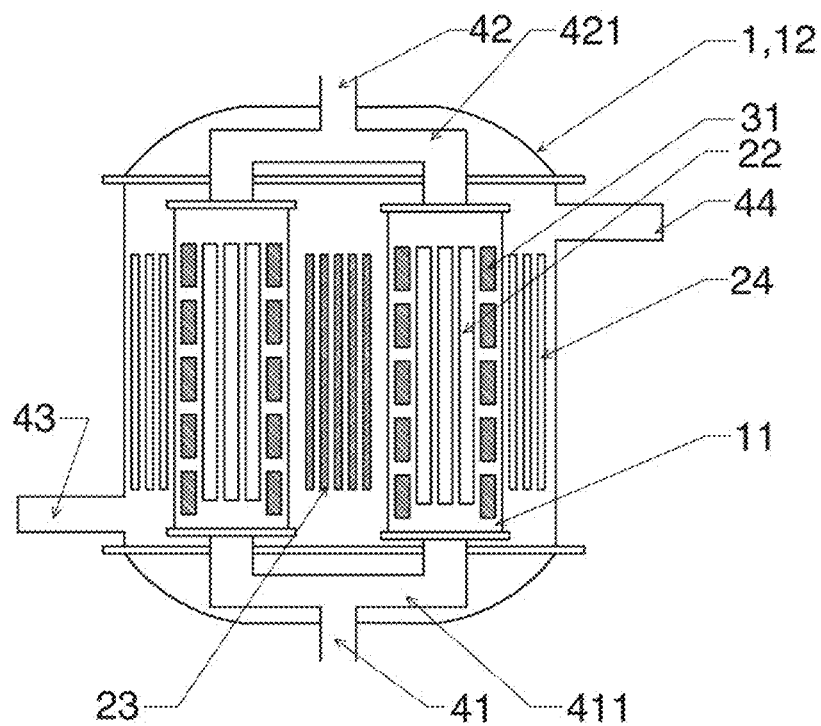
FIG. 16 is a schematic cross-sectional diagram of a nuclear reactor according to the present invention which uses the primary coolant and the secondary coolant by circulating the coolants in the nuclear reactor.

FIG. 16 is a schematic vertical cross-sectional diagram of the structure of this nuclear reactor. The primary coolant inlet pipe 41 attached to the nuclear reactor vessel 1 is branched using an inlet pipe manifold 411 in order to be connected to the inlet pipes leading to the multiple set first vessels 11. Furthermore, the outlet pipes of the respective first vessel are connected to a single nuclear reactor outlet pipe 42 using an outlet pipe manifold 421.

Figure 5:
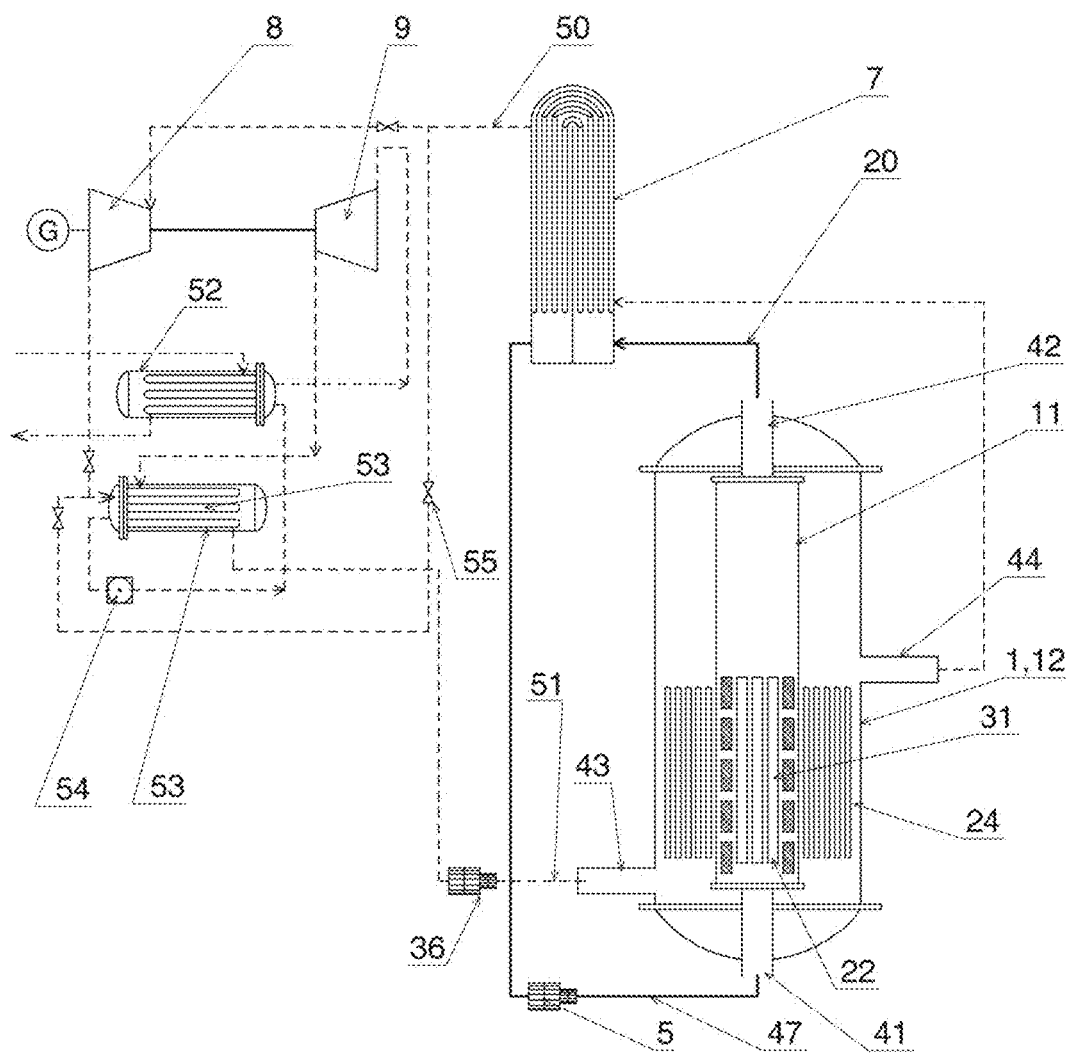
FIG. 5 illustrates a nuclear reactor system according to the present invention which uses metallic Na as a primary coolant, and supercritical carbon dioxide ($CO_2$) as a secondary coolant.
Figure 17:
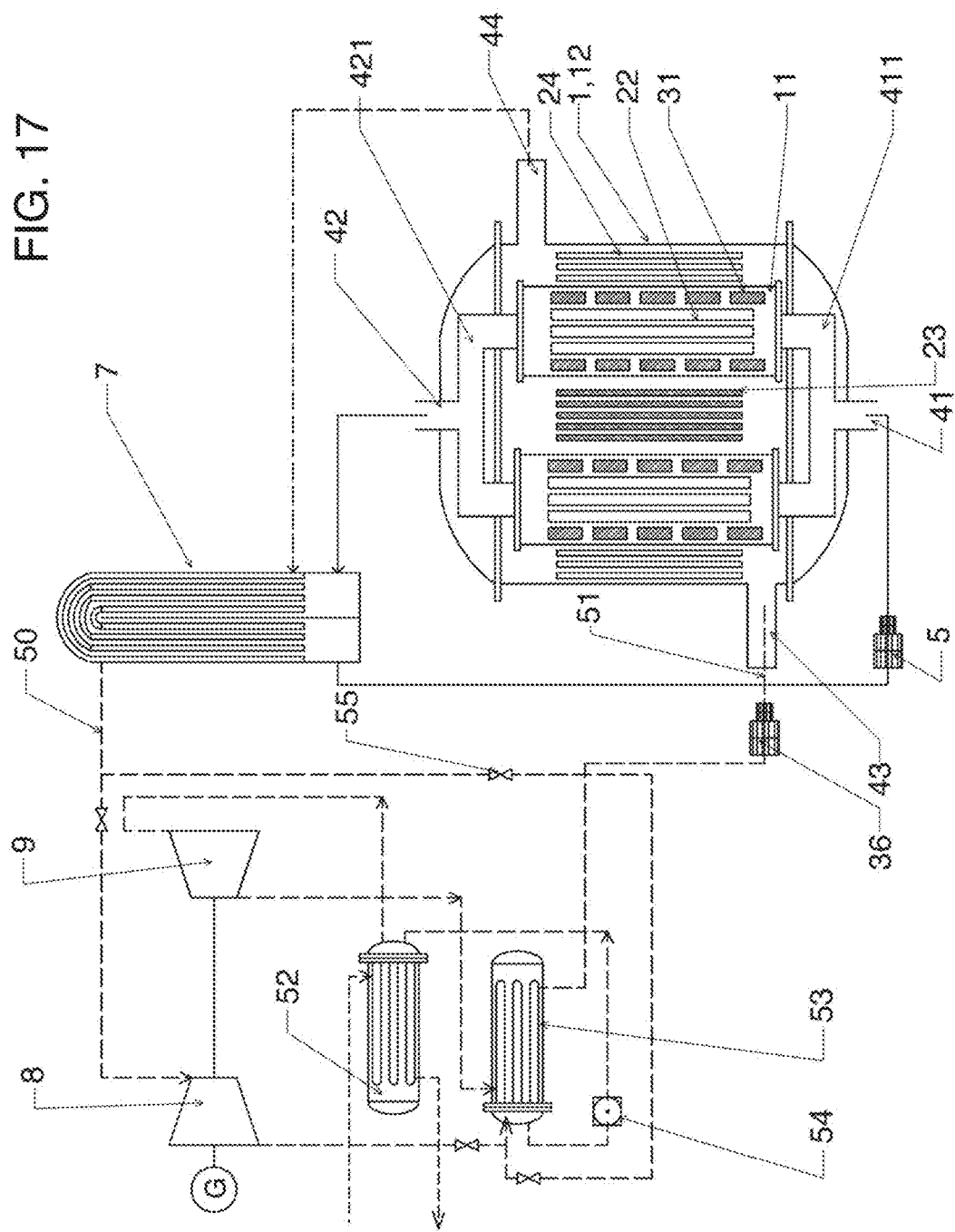
FIG. 17 is a schematic diagram of a nuclear reactor system according to the present invention in which multiple groups of fuel assemblies (first vessels) are set, and which uses metallic Na as the primary coolant, and supercritical $CO_2$ gas as the secondary coolant.

Next, FIG. 17 illustrates a nuclear reactor system which uses metallic Na as the primary coolant and supercritical $CO_2$ gas as the secondary coolant, and which includes the multiple fuel assembly groups arranged therein. The apparatuses outside the nuclear reactor vessel 1 work in the same way as those outside the nuclear reactor vessel 1 illustrated in FIG. 5, and descriptions for how they work will be omitted.

Embodiment 7

In the case where a light-water reactor is actually operated, it is desirable that the operation efficiency be improved with cost reduction taken into consideration. For the purpose of improving the operation efficiency, it is important to control a degree of combustion of nuclear fuel. This control requires use of safety systems from an engineering viewpoint, inclusive of a control rod and an emergency cooling system. However, there remains likelihood that fuel rods are damaged at high temperature. The present invention aims at a simplified nuclear reactor system which is safer and capable of reducing radioactivity by employing the metal fuel rods and the load following control method. The prerequisite for the simplification of a nuclear reactor system is the use of PB—Bi as the primary coolant and water as the secondary coolant.

Figure 18:
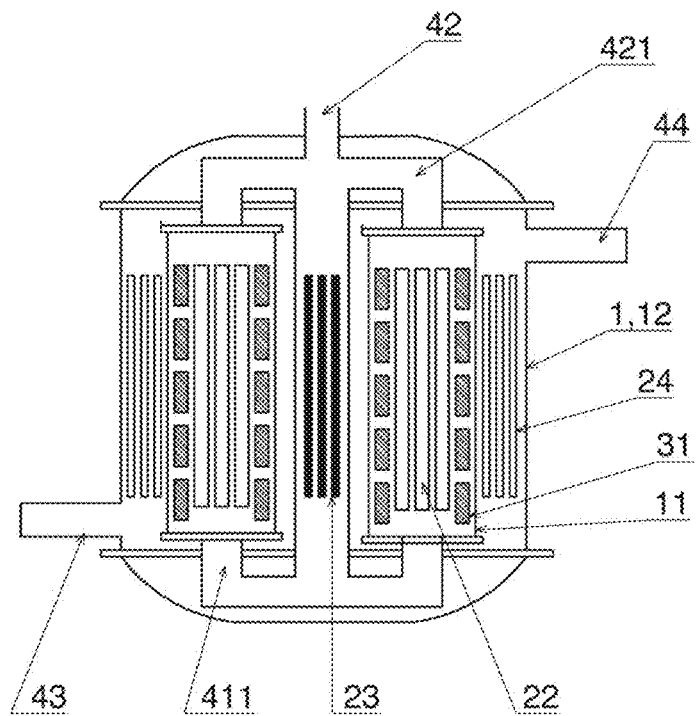
FIG. 18 is a schematic cross-sectional diagram of a nuclear reactor according to the present invention which uses only the secondary coolant of circulation type.

FIG. 18 illustrates a method of making the primary coolant circulate naturally inside the first vessel, but not forcedly, by closing the inlet pipe section. In FIG. 18, the multiple first vessels 11 are connected using the manifolds 411, 421. Thus, the primary coolant undergoes natural convection among the first vessels. The reactor 31 and the fuel assemblies 22 are loaded in each first vessel 11. On the other hand, the FA reducing rods 24 are arranged in the peripheral pail of the inside of the second vessel 12, while the MA reducing rods 23 are arranged in the first vessel in the central part of the second vessel 12 because of high density of the fast neutrons. Water is supplied into the second vessel 12 from the inlet 43, and is drained from the outlet 44. The outlet pipe 42 of the first vessels 11 is used to remove gaseous components and the like generated from the primary coolant.

Figure 19:
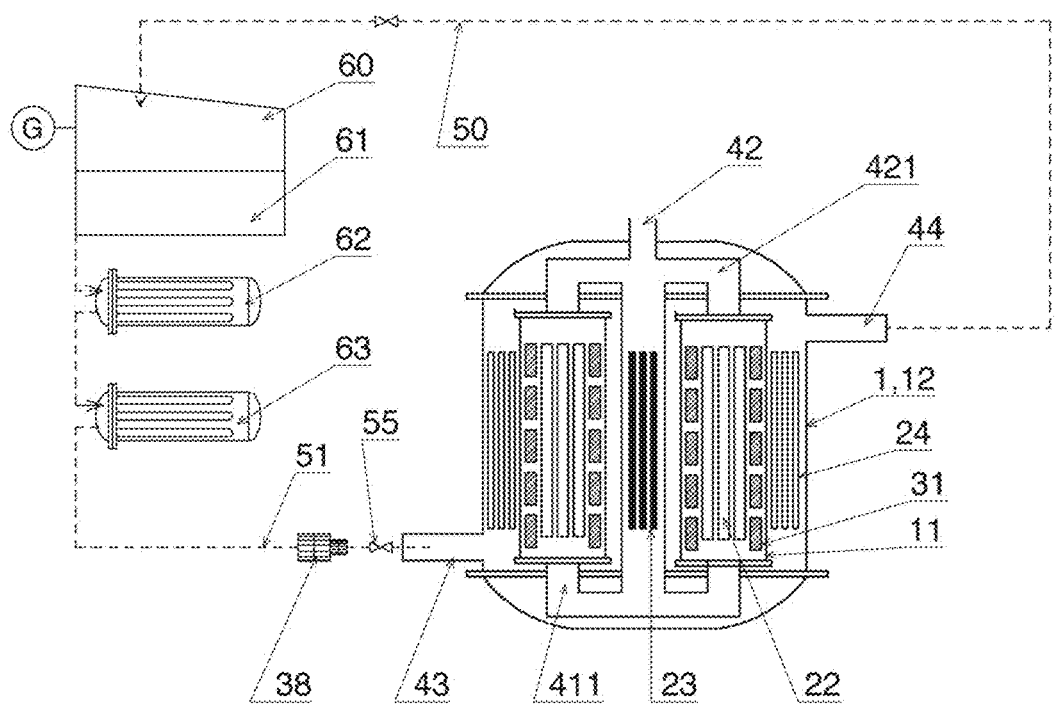
FIG. 19 is a schematic diagram of a nuclear reactor system according to the present invention in which multiple groups of fuel assemblies (second vessels) are loaded while circulating the secondary coolant through them.

FIG. 19 illustrates a nuclear reactor system including this nuclear reactor. Steam from the second vessel outlet 44 is sent to the steam turbine 60, and is changed into water by the condenser 61. The resultant water passes through the heaters 62, 63, and is returned to the nuclear reactor vessel 1 by the circulation pump. The secondary coolant is changed into steam again by being re-heated by the fuel assembly groups 22.

Embodiment 8

Figure 20:
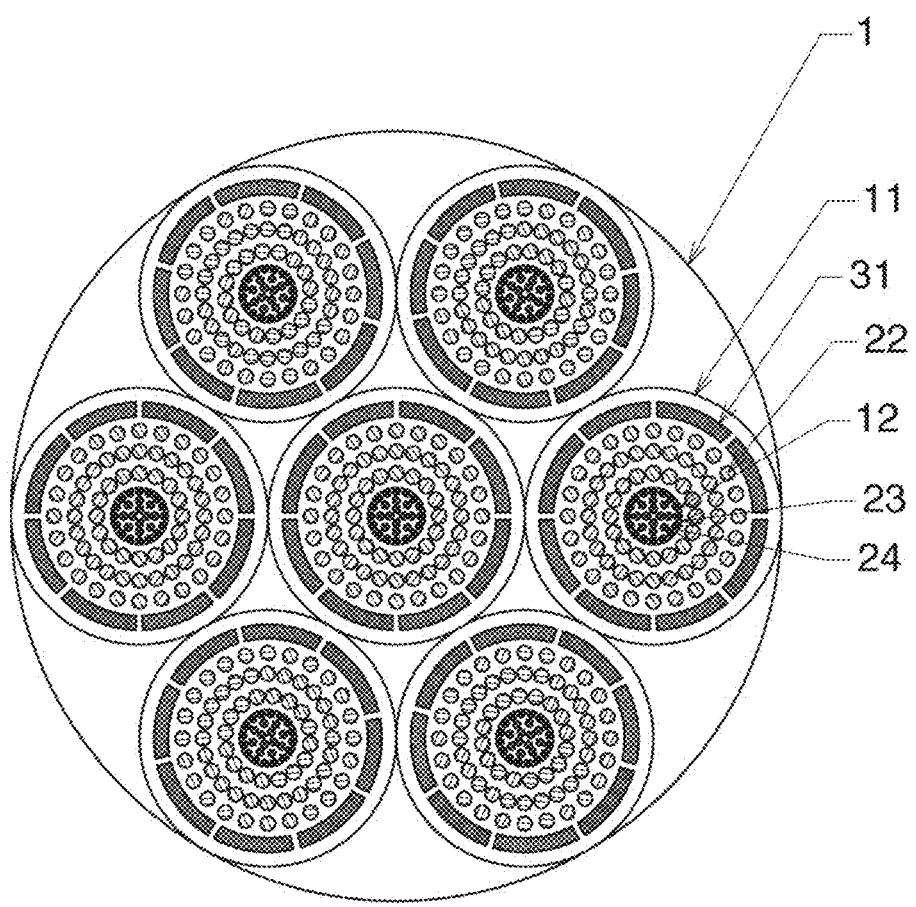
FIG. 20 is a schematic transverse cross-sectional diagram of a large-scale nuclear reactor according to the present invention in which multiple groups of fuel assemblies are loaded.
Figure 21:
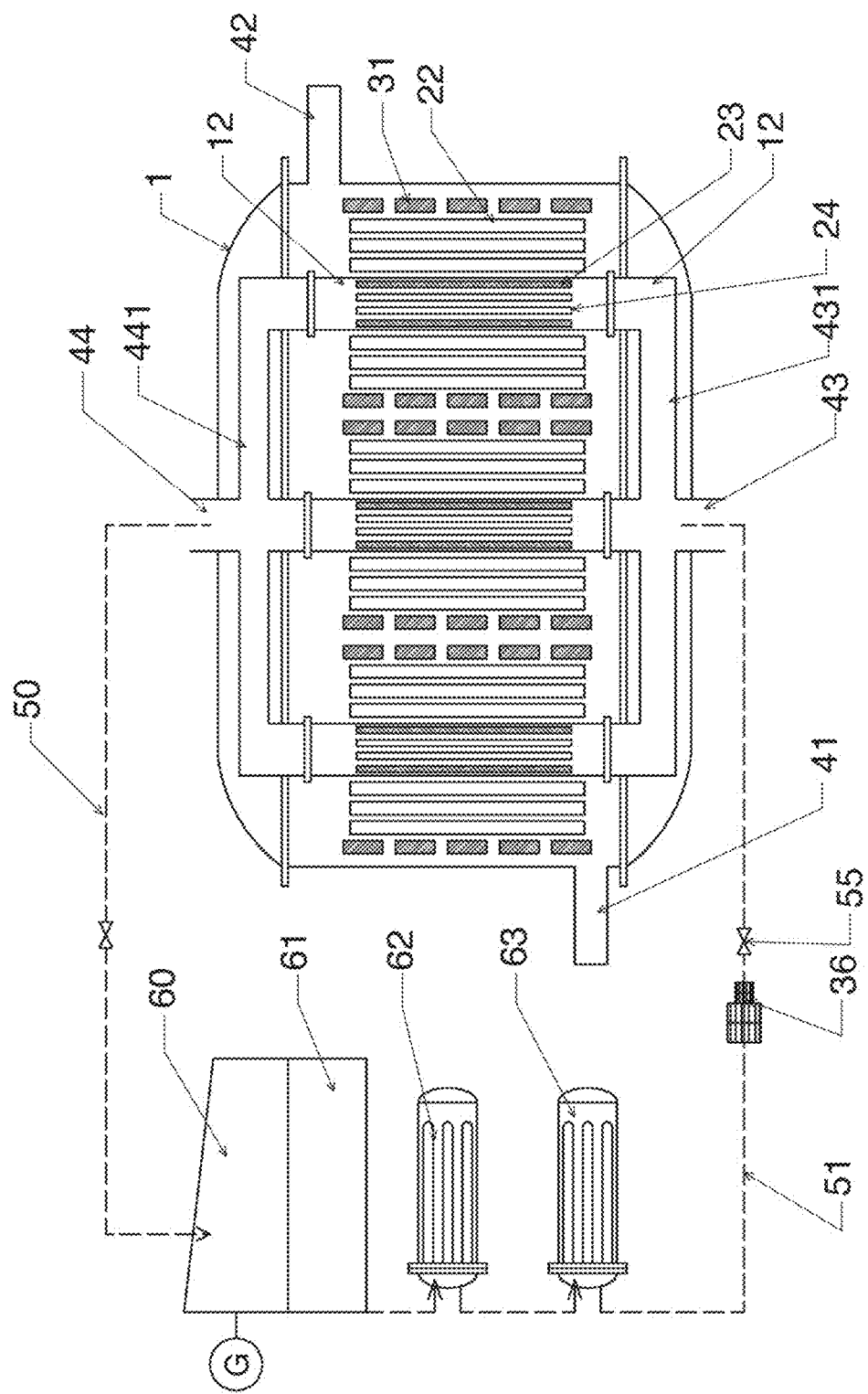
FIG. 21 is a schematic diagram of a nuclear reactor system according to the present invention which makes the primary coolant undergo natural convention, and which includes multiple radioactivity reducing sections.

Next, referring to FIGS. 20 and 21, descriptions will be provided for a method of applying the present invention to a large-scale nuclear reactor. Multiple first vessels 11 each in which the reflector 31 and a group of the fuel assemblies 22 are placed are set in the nuclear reactor vessel 1. After the pressure vessel 1 is filled with Pb—Bi or Sn as the primary coolant, the primary coolant inlet and outlet 41, 42 are closed. This embodiment has a structure which is adaptable to large-scale nuclear reactor specifications. First of all, in a case where the nuclear reactor vessel becomes larger, a larger number of reflectors and a number of fuel assembly groups can be contained in the nuclear reactor vessel. In a case illustrated in FIG. 21, the inlets of the respective second vessels 12 are connected together using a manifold 431. Furthermore, the outlets of the respective second vessels are connected together using a manifold 441. No primary coolant circulation line is connected to the first vessels 11, and the primary coolant is made to undergo natural convection in each first vessel 11. In this embodiment, Pb—Bi is used as the primary coolant, and water is used as the secondary coolant. Water is heated inside each second vessel in which the reducing assemblies 23, 24 are loaded, and is changed into steam. This steam is sent to the turbine 60 and the condenser 61, and thereby generates electricity.

Embodiment 9

Figure 22:
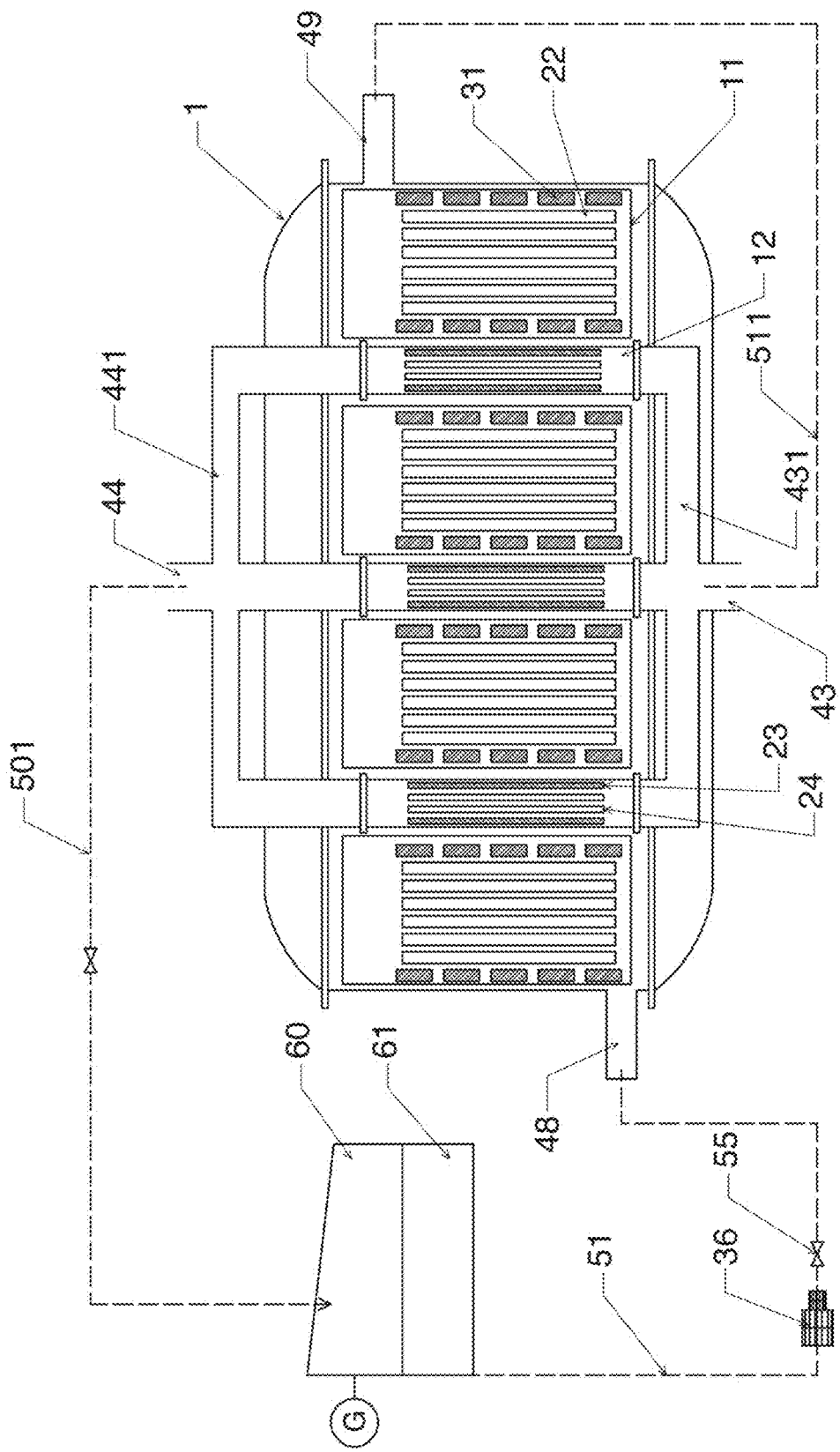
FIG. 22 is a schematic diagram of a larger-scale nuclear reactor system according to the present invention which makes the primary coolant undergo natural convention, and which includes multiple radioactivity reducing sections.

Next, FIG. 22 illustrates an embodiment of the present invention which is applied to a much larger-scale nuclear reactor. Multiple first vessels 11 serving as the fast neutron regions and multiple second vessels 12 serving as the thermal neutron regions are arranged in the nuclear reactor pressure vessel 1. The fuel assemblies 22 and the reflector 31 are arranged in each first vessel. The MA reducing assemblies 23 and the FP reducing assemblies 24 are loaded in each second vessel. Cooling water is supplied from the condenser 61 to a secondary coolant inlet 48 of the pressure vessel 1 using the circulation pump 36. As the secondary coolant supplied into the pressure vessel, water is preliminarily heated by the second vessels 12. This preliminary-heated secondary coolant is drained from the outlet 49, and is sent to the secondary coolant inlet manifold 431 attached to the second vessels 12. As the secondary coolant, water is further heated in the second vessels, and is changed into steam. The steam is sent to a steam line 501 via the outlet manifold 441. This steam drives the turbine 60, and generates electricity. In this embodiment, the outlet and inlet of each first vessel 11 is closed, and as the primary coolant filled therein, Pb—Bi removes heat through natural convection. Furthermore, the fuel assemblies are burned using multi-layered reactor, and is controlled by temperature inside the first vessels.

Although the foregoing descriptions have been provided for the embodiments, the present invention is not limited to the embodiments. It is clear to those skilled in the art that the present invention can be variously modified and corrected within the spirit of the present invention and within the accompanying scope of claims.

REFERENCE SIGNS LIST 1 nuclear reactor pressure vessel
5 primary coolant circulation pump
7 main heat exchanger
8 supercritical $CO_2$ gas turbine
9 supercritical $CO_2$ gas compressor
11 fast neutron region (first vessel)
12 thermal neutron region (second vessel)
21 radioactivity reducing assembly
22 fuel assembly
23 MA reducing assembly
24 FP reducing assembly
31 reflector
36 secondary coolant circulation pump
37 supply pump
41 primary coolant inlet
42 primary coolant outlet
43 moderator/coolant (secondary coolant) inlet
44 moderator/coolant (secondary coolant) outlet
46 primary coolant return line
47 primary coolant supply line
50 secondary coolant turbine supply line
51 secondary coolant return line
52 cooler
53 regenerative heat exchanger
54 supercritical $CO_2$ gas circulation pump
55 isolation valve
59 accumulator
60 steam turbine
61 condenser
62 low-pressure heater
63 high-pressure heater
121 outer shell solenoid coil
122 inner shell solenoid coil
123 solenoid coil
140 fast neutron control rod
141 thermal neutron control rod
160 natural convection acceleration cylinder
221 fuel rod
222 fuel assembly spacer
300 reflector support rod
301 spring-shaped bimetal
302 reflector segment
311 ring-shaped multi-layered reflector main body
313 ring-shaped multi-layered reflector support plate
315 reflector thermal expansion deformation spring
411 primary coolant inlet pipe manifold
421 primary coolant outlet pipe manifold

The invention claimed is:

1. A nuclear reactor system including a nuclear reactor vessel,
wherein the nuclear reactor vessel includes a first vessel serving as a region using fast neutrons, and a second vessel serving as a region using thermal neutrons in a nuclear reactor, energy of each thermal neutron being approximately 0.5 MeV or less, and the second vessel for the thermal neutrons is placed inside the first vessel for the fast neutrons or the first vessel for the fast neutrons is placed inside the second vessel for the thermal neutrons,
the region using the fast neutrons includes
a plurality of fuel assemblies, each fuel assembly being a bundle of 50 or more metal fuel rods, each metal fuel rod being obtained by inserting a metal fuel pin into a sheath made of stainless steel, the metal fuel pin having an alloy composition of zirconium (Zr) with uranium (U) and/or plutonium (Pu), and
a liquid metal selected from metallic sodium (Na), Pb—Bi or Pb working as a primary coolant,
a non-metallic material and radioactivity reducing assemblies are loaded in the region using the thermal neutrons, the non-metallic material being usable as a neutron moderator and as a secondary coolant, each radioactivity reducing assembly being obtained by putting a radioactive material into a sheath made of stainless steel or a Zr material, the radioactive material being obtained by processing minor actinide nuclides separated from spent fuel rods through reprocessing or radioactive nuclear fission products (FPs) separated and refined from the spent nuclear fuel, at least one selected from the group consisting of Se79, Sr90, Zr93, Tc99, Sn126, Cs135 and Cs137, being mixed and formed into a shape of a pellet or a pin, and
the nuclear reactor system is configured
to generate electricity by transferring thermal energy generated by the fast neutrons to a heat exchanger by use of the primary coolant, exchanging heat between the primary coolant and the secondary coolant in the heat exchanger, and thereafter supplying the thermal energy to a turbine system by use of the secondary coolant, and
to simultaneously decrease a concentration of radionuclides by accelerating a rate of transmutation of radionuclides into stable nuclides by use of thermal neutrons generated by decelerating the fast neutrons.

2. The nuclear reactor system according to claim 1,
wherein the nuclear reactor system uses metallic sodium (Na) as the primary coolant for the fuel assemblies, and carbon dioxide gas ($CO_2$) as the secondary coolant for the radioactivity reducing assemblies, the carbon dioxide gas working as the coolant and as the moderator,
the nuclear reactor system further includes a $CO_2$ gas driven turbine, and
wherein the nuclear reactor system enhances heat exchange efficiency by once supplying the $CO_2$ gas, returning from the turbine system, to the radioactivity reducing second vessel, and thereafter supplying the $CO_2$ gas to the heat exchanger for transferring heat between the primary coolant and the secondary coolant.

3. The nuclear reactor system according to claim 1,
wherein the nuclear reactor system uses lead-bismuth (Pb—Bi) or Pb alone as the primary coolant for the fuel assemblies, and water ($H_2O$) as the secondary coolant concurrently working as a moderator for the radioactivity reducing assemblies,
the nuclear reactor system further includes a steam turbine, and
wherein the nuclear reactor system enhances heat exchange efficiency by supplying $H_2O$, returning from the turbine system, to the second vessel in which the radioactivity reducing assemblies are loaded, and thereafter supplying the $H_2O$ to the heat exchanger for transferring heat between the primary coolant and the secondary coolant.

4. The nuclear reactor system according to claim 1, wherein the nuclear reactor system uses supercritical carbon dioxide ($CO_2$) gas as the secondary coolant.

5. The nuclear reactor system according to claim 1, wherein the reflector is arranged surrounding the plurality of fuel assemblies loaded in the first vessel, the reflector being deformable due to thermal expansion, the reflector having a structure which makes temperature and reflector efficiency inversely correlated to each other, the reflector being capable of automatically controlling nuclear fission reaction induced by fast neutrons.

6. The nuclear reactor system according to claim 5, wherein
a structure of the reflector uses carbon (C) or beryllium (Be) as a constituent material,
the reflector is divided into four or more segments in a circumferential direction,
a spring made of stainless steel with a large thermal expansion coefficient is attached to each reflector segment, and
the structure of the reflector is configured to decrease reflection efficiency depending on thermal expansion of the spring with a rise in temperature.

7. The nuclear reactor system according to claim 5, wherein
a structure of the reflector is divided into segments in a radial direction and in a height direction,
each reflector segment is formed by filling graphite or carbon into a case made of stainless steel,
each two reflector segments are connected by stainless steel, and
the structure of the reflector is configured to be capable of decreasing neutron reflection efficiency of the reflector depending on thermal expansion of the stainless steel.

8. The nuclear reactor system according to claim 1, wherein
a solenoid coil is arranged surrounding the radioactivity reducing assemblies which are loaded in the second vessel, the nuclear fission products (FPs) being mixed into each radioactivity reducing assembly, and
the nuclear reactor system is configured to accelerate a rate of β-decay of the radioactive nuclear fission products by
generating a low-frequency electromagnetic field at a frequency of 50 kHz to 50 MHz, and
concurrently applying the thermal neutrons to the radioactivity reducing assemblies, the thermal neutrons being obtained by decelerating the fast neutrons which are generated in the first vessel outside the second vessel.

9. The nuclear reactor system according to claim 1, wherein
solenoid-shaped winding is arranged along a radial circumference of the second vessel,
the radioactivity reducing assemblies into which the radioactive nuclear fission waste is mixed are loaded in the second vessel, and
the nuclear reactor system is configured to accelerate a rate of transmutation of FP elements into stable elements by
applying a low-frequency electromagnetic field at a frequency of 100 kHz to 10 MHz to the radioactivity reducing assemblies, and
further bombarding an inside of the first vessel placed in the second vessel with thermal neutrons which are generated from a reactor core including the reflector.

10. The nuclear reactor system according to claim 1, wherein
the first vessel is formed in a shape of a cylinder with a diameter of 2 m or less,
each fuel assembly to be contained in the nuclear reactor vessel includes 50 or more fuel rods, each of which is formed with a diameter of 5 to 15 mm and with a length of 2 m or less,
six or more of the fuel assemblies are loaded in the first vessel, and
the reflector deformable due to thermal expansion is arranged surrounding the fuel assemblies in order to realize a load following control scheme.

11. The nuclear reactor system according to claim 1, wherein
in the fuel assemblies, a fuel pin into which minor actinide elements are mixed is inserted into each fuel rod sheath, and
the nuclear reactor system is thereby configured to accelerate transmutation of radioactive minor actinide elements into stable elements by use of the fast neutrons.

12. The nuclear reactor system according to claim 1, wherein
a diameter of the nuclear reactor vessel is 2 m or greater,
two or more of the first vessels serving as the fast neutron region and two or more of the second vessels serving as the thermal neutron region are set in the vessel,
the metal fuel assemblies are loaded in each first vessel, and each first vessel is filled with the primary coolant of liquid metal,
the radioactivity reducing assemblies containing minor actinides and/or radioactive nuclear fission products (FPs) separated and refined from the spent nuclear fuel, at least one selected from the group consisting of Se79, Sr90, Zr93, Tc99, Sn126, Cs135 and Cs137, being mixed and formed into a shape of a pellet or a pin, are loaded in each second vessel, and
the nuclear reactor system removes heat from the vessel and the radioactivity reducing assemblies containing the radioactive waste by making the secondary coolant flow in the vessel and the radioactivity reducing assemblies, and further uses the heat to generate electricity.

13. A method comprising: in a nuclear reactor system,
forming a nuclear reactor vessel with a first vessel serving as a region using fast neutrons, and a second vessel serving as a region using thermal neutrons, energy of each thermal neutron being approximately 0.5 MeV or less;
arranging a plurality of fuel assemblies and a liquid metal in the region using the fast neutrons, each fuel assembly being a bundle of 50 or more metal fuel rods, each metal fuel rod being obtained by inserting a metal fuel pin into a sheath made of stainless steel, the metal fuel pin having an alloy composition of zirconium (Zr) with uranium (U) and/or plutonium (Pu), the liquid metal working as a primary coolant;
accelerating transmutation of radioactive minor actinide elements into stable elements by use of fast neutrons by inserting the metal fuel pin, into which minor actinide elements are mixed, into each fuel rod sheath in the fuel assemblies; and
loading a non-metallic material and radioactivity reducing assemblies in the region using the thermal neutrons, the non-metallic material being usable as a neutron moderator and a secondary coolant, each radioactivity reducing assembly being obtained by putting a radioactive material into a sheath made of stainless steel or a Zr material, the radioactive material being obtained by processing minor actinide nuclides separated from spent fuel rods through reprocessing, or radionuclides as nuclear fission products, into a shape of a pellet or a pin, wherein the method
- generates electricity by transferring thermal energy generated by the fast neutrons to a heat exchanger by use of the primary coolant, exchanging heat between the primary coolant and the secondary coolant in the heat exchanger, and thereafter supplying the thermal energy to a turbine system by use of the secondary coolant, and
- simultaneously decreases a concentration of radionuclides by accelerating a rate of transmutation of radionuclides into stable nuclides by use of thermal neutrons generated by decelerating the fast neutrons.

14. The method according to claim 13,
wherein the method uses metallic sodium (Na) as the primary coolant for the fuel assemblies, and carbon dioxide ($CO_2$) gas as the secondary coolant for the radioactivity reducing assemblies, the carbon dioxide gas working as the coolant and as the moderator,
the method further uses a $CO_2$ gas driven turbine, and
wherein the method enhances heat exchange efficiency by once supplying the $CO_2$ gas, returning from the turbine system, to the radioactivity reducing second vessel, and thereafter supplying the $CO_2$ gas to the heat exchanger for transferring heat between the primary coolant and the secondary coolant.

15. The method according to claim 13,
wherein the method uses lead-bismuth (Pb—Bi) or Pb alone as the primary coolant for the fuel assemblies, and water ($H_2O$) as the secondary coolant concurrently working as a moderator for the reducing assemblies,
the method further uses a steam turbine, and
wherein the method enhances heat exchange efficiency by supplying $H_2O$, returning from the turbine system, to the second vessel in which the radioactivity reducing assemblies are loaded, and thereafter supplying the $H_2O$ to the heat exchanger for transferring heat between the primary coolant and the secondary coolant.

16. The method according to claim 13, wherein
a solenoid coil is arranged surrounding the radioactivity reducing assemblies which are loaded in the second vessel, the nuclear fission products (FPs) being mixed into each radioactivity reducing assembly, and
the method accelerates a rate of $\beta$-decay of the radioactive nuclear fission products by
generating a low-frequency electromagnetic field at a frequency of 50 kHz to 50 MHz, and
concurrently applying the thermal neutrons to the radioactivity reducing assemblies, the thermal neutrons being obtained by decelerating the fast neutrons which are generated in the first vessel outside the second vessel.

17. The method according to claim 13, wherein
solenoid-shaped winding is arranged along a radial circumference of the second vessel,
the radioactivity reducing assemblies into which the radioactive nuclear fission waste is mixed are loaded in the second vessel, and
the method accelerates a rate of transmutation of FP elements into stable elements by
applying a low-frequency electromagnetic field at a frequency of 100 kHz to 10 MHz to the radioactivity reducing assemblies, and
further bombarding an inside of the first vessel placed in the second vessel with thermal neutrons which are generated from a reactor core including the reflector.

18. The method according to claim 13, wherein the method performs load following control by
forming the first vessel in a shape of a cylinder with a diameter of 2 m or less,
using 50 or more fuel rods, each formed with a diameter of 5 to 15 mm and with a length of 2 m or less, in each fuel assembly to be contained in the nuclear reactor vessel,
loading six or more of the fuel assemblies in the first vessel, and
arranging the reflector, deformable due to thermal expansion, to surround the fuel assemblies.

* * * * *